United States Patent [19]

Conway

[11] Patent Number: 5,732,401
[45] Date of Patent: Mar. 24, 1998

[54] ACTIVITY BASED COST TRACKING SYSTEMS

[75] Inventor: David W. Conway, Loveland, Ohio

[73] Assignee: Intellitecs International Ltd., Cincinnati, Ohio

[21] Appl. No.: 626,642

[22] Filed: Mar. 29, 1996

[51] Int. Cl.$^6$ ..................................................... G06F 17/60
[52] U.S. Cl. ............................... 705/29; 364/400; 705/1; 705/2; 705/3; 705/28; 705/400
[58] Field of Search ........................... 364/400, 464.01, 364/464.1, 468.22; 395/201, 202, 203, 207, 208, 228, 229; 705/1, 2, 3, 7, 8, 28, 29, 400

[56] References Cited

U.S. PATENT DOCUMENTS

| | | | |
|---|---|---|---|
| 3,703,725 | 11/1972 | Gomersall et al. | 364/490 |
| 3,929,277 | 12/1975 | Byrne et al. | 235/61.6 R |
| 4,049,950 | 9/1977 | Byrne et al. | 235/61.6 R |
| 4,101,873 | 7/1978 | Anderson et al. | 340/539 |
| 4,225,953 | 9/1980 | Simon et al. | 367/117 |
| 4,275,385 | 6/1981 | White | 340/312 |
| 4,296,408 | 10/1981 | Neuringer | 340/539 |
| 4,347,501 | 8/1982 | Akerberg | 340/539 |
| 4,464,792 | 8/1984 | Owerko | 455/128 |
| 4,471,345 | 9/1984 | Barrett, Jr. | 340/572 |
| 4,476,461 | 10/1984 | Carubia | 340/667 |
| 4,549,264 | 10/1985 | Carroll et al. | 364/406 |
| 4,656,463 | 4/1987 | Anders et al. | 340/572 |
| 4,688,026 | 8/1987 | Scribner et al. | 340/572 |
| 4,857,893 | 8/1989 | Carroll | 340/572 |
| 4,942,527 | 7/1990 | Schumacher | 395/209 |
| 4,963,887 | 10/1990 | Kawashima et al. | 342/44 |
| 5,021,790 | 6/1991 | Ohta et al. | 342/44 |
| 5,144,314 | 9/1992 | Malmberg et al. | 342/44 |
| 5,166,676 | 11/1992 | Milheiser | 340/825.54 |
| 5,172,313 | 12/1992 | Schumacher | 395/207 |
| 5,173,705 | 12/1992 | Camiade et al. | 342/42 |
| 5,249,120 | 9/1993 | Foley | 395/201 |
| 5,296,722 | 3/1994 | Potash et al. | 257/50 |
| 5,570,291 | 10/1996 | Dudle et al. | 364/468.01 |

*Primary Examiner*—Edward R. Cosimano
*Attorney, Agent, or Firm*—Wood,Herron&Evans,L.L.P.

[57] ABSTRACT

A system for tracking costs of medical procedures by monitoring the movements of personnel, supplies and equipment and processing data on these movements to produce detailed and accurate cost accounting records associated with particular services rendered. Transponder tags are associated with each person and object for which costs are to be tracked. The detected movements of the tags are combined with scheduling, procedure and cost information to build detailed records of activities and the costs thereof in a manner permitting a wide variety of statistical and other analyses.

31 Claims, 8 Drawing Sheets

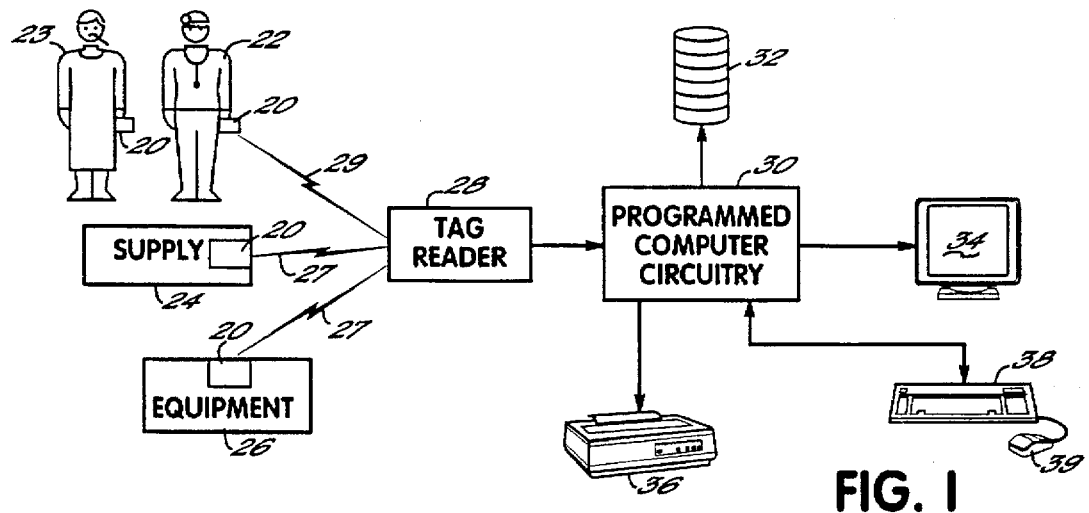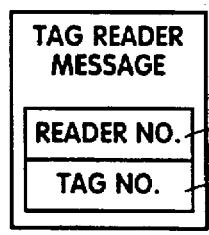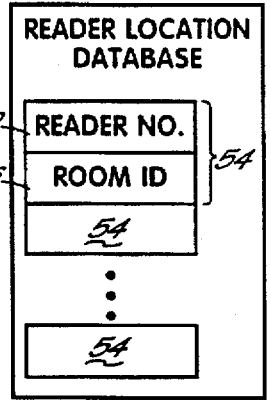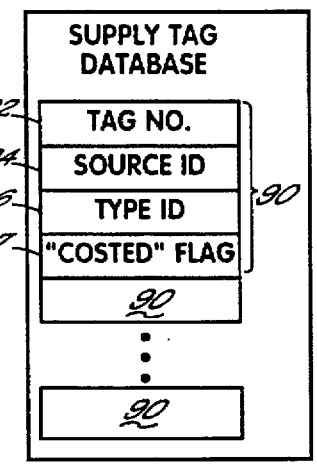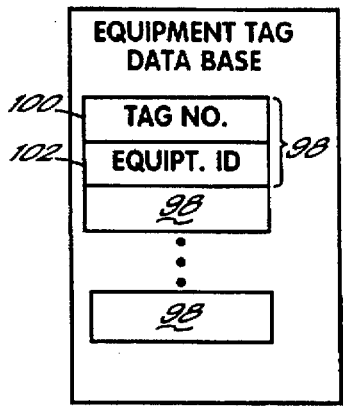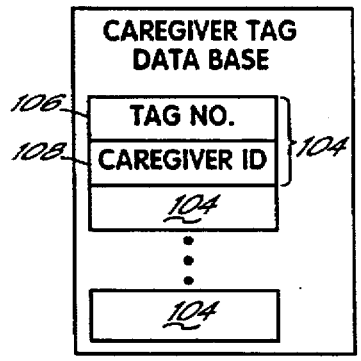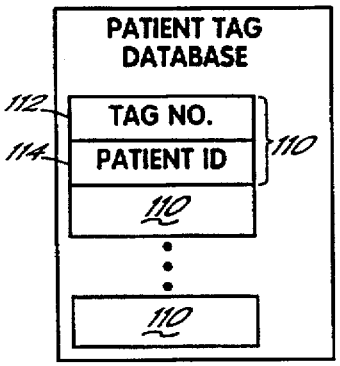

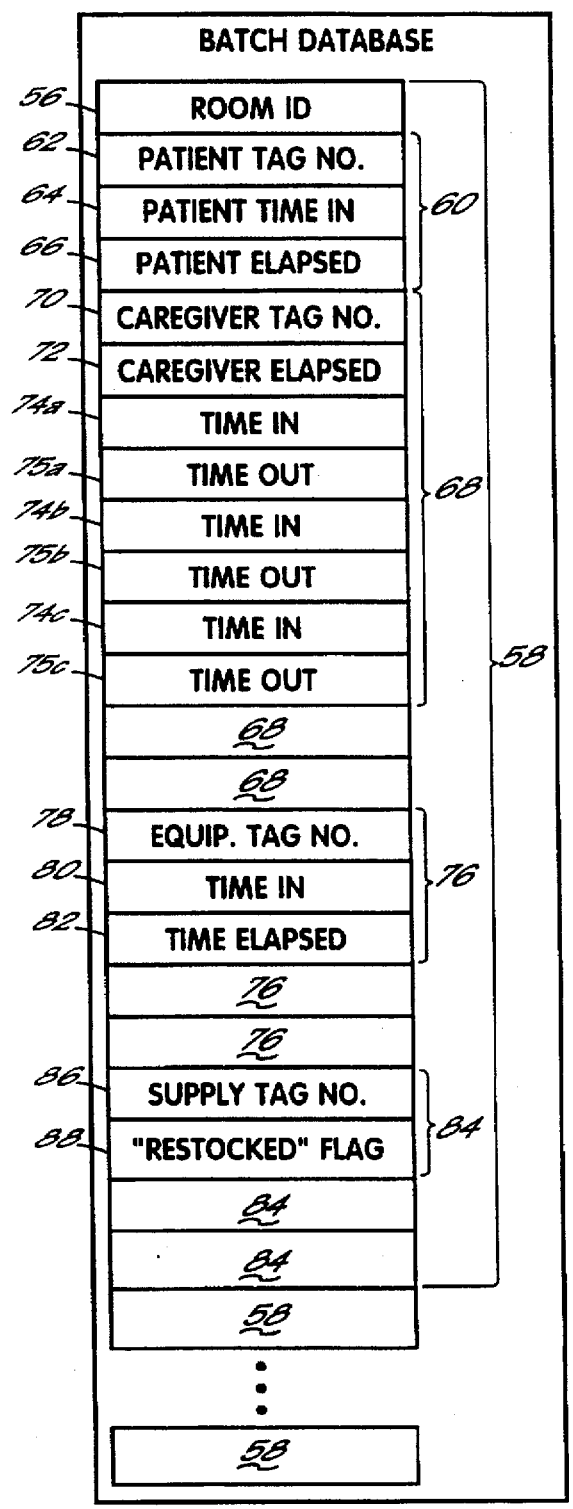

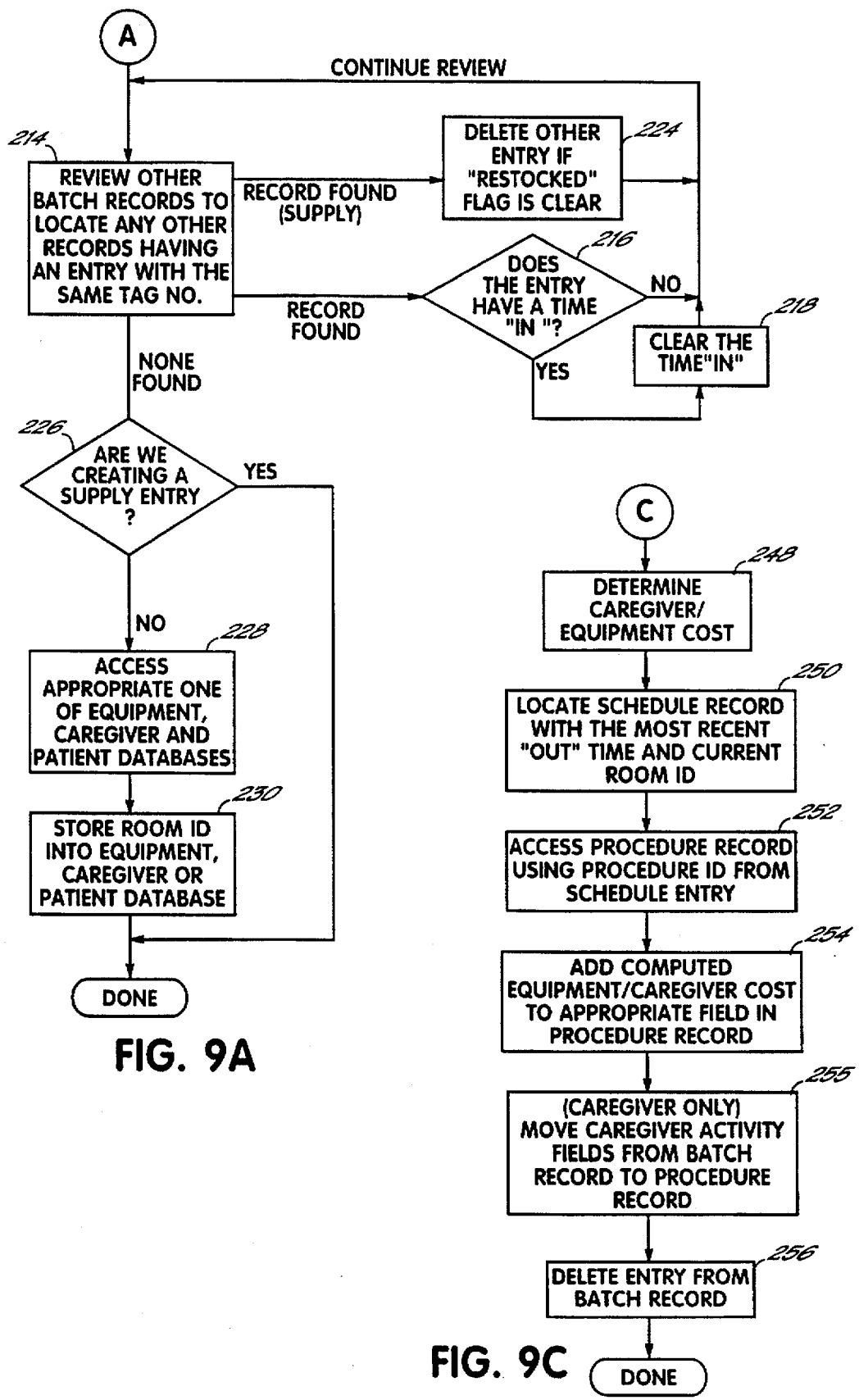

5,732,401

ACTIVITY BASED COST TRACKING SYSTEMS

FIELD OF THE INVENTION

The present invention relates to systems for tracking the costs of medical procedures by monitoring movements of personnel and/or equipment and supplies during the procedure and associating each with a particular cost.

BACKGROUND OF THE INVENTION

The medical service industry is in need of an improved system for tracking costs. Cost tracking is needed to establish profitable pricing and to monitor expenses and client budgets. Furthermore, cost tracking is needed to evaluate the costs of various alternative approaches to providing a particular medical service, in order to reduce or maintain costs while maintaining or enhancing quality and profitability.

In a typical medical procedure, for example, surgery, a patient is brought into a treatment room and met by a number of caregivers. Supplies, for example a custom procedure tray including specific supplies needed for that procedure, are brought into the room for the procedure. Furthermore, medical equipment is either brought into the room or may be permanently installed there. Upon completion of the procedure, the caregivers and patient depart, the consumed supplies are disposed, and the equipment is prepared for the next procedure.

Each of the persons and objects involved in this typical procedure, i.e., the caregivers, the supplies and the equipment, has a unique cost which can be determined on an hourly or per-use basis. At the present time, only a small fraction of these objects or costs are tracked; for example, the cost of the custom procedure tray may be charged to the patient, and a nurse may keep a count of sponges to ensure that none become lost during the procedure. However, typically there is no system for tracking, for example, the human labor costs of the caregivers, or the costs of equipment used, and as a result these costs cannot be later adequately identified or associated with the procedure performed.

Medical service providers are typically compensated by insurance carriers on the basis of the number of insured lives handled by the service provider. Although actuarial data can predict the number of these insured lives that will present various specific maladies or require specific treatments, typically there is insufficient data to determine the cost of providing these specific treatments or curing the specific maladies, and thus insufficient data to accurately quote pricing on a per-life basis. As a result, medical service providers are often reduced to guessing at their costs when determining pricing for insurers, leading to pricing which is often not commensurate with costs. Furthermore, for the same reasons, it can be difficult or impossible to determine which procedures or maladies are the most costly and in need of cost improvement analysis.

In some service businesses, service providers individually track and account for time spent on various projects, so that this time may be entered into an accounting system and used for billing to clients. However, this kind of system would be challenging to establish in a medical environment as it would require modifying the behaviors of medical personnel. Furthermore, medical services are often provided on an emergency basis and as a result, even under the best conditions, it is not always possible to fully track time spent and supplies consumed on a project by project basis.

In the past it has been proposed to monitor the activities and positions of medical service providers (caregivers) by providing each caregiver with a coded transponder, and monitoring the movements of the transponders through wireless transmissions. While the primary goal of systems of this kind has been to rapidly locate caregivers in emergency situations, it has also been proposed to use information on the movements of caregivers to provide billing details to patients. Unfortunately, although these proposed systems monitor human movements, they fail to provide accurate cost figures for particular medical services, in that there is no provision for accurately associating the movements or time spent by an individual caregiver with particular services rendered; nor is there any provision for tracking other expenses such as the costs of supplies and rental value of equipment. But without a means for accurately associating procedures performed by caregivers with the costs of caregiver time and related expenses for supplies and equipment, one cannot accurately account for the cost of particular services and thus cannot accurately price medical services or monitor and budget expenses. Thus, there remains a need for a system for tracking the costs accumulated in rendering a particular service.

SUMMARY OF THE INVENTION

In accordance with principles of the present invention, the movements of personnel, supplies and equipment are monitored and data on these movements is processed to produce detailed and accurate cost accounting records associated with particular medical services rendered. These detailed records can then be used to estimate the costs of future procedures and/or to evaluate the costs of various alternative care regimens to establish best practice guidelines for performing particular procedures or care of particular maladies.

Specifically, in one aspect, an activity-based cost tracking system in accordance with principles of the present invention tracks the costs of activities of persons and objects in a defined space such as a room. A transponder is attached to each person and object, and the transponders transmit an identifying code. A transponder reader located in the defined space reads the code from each of the transponders. A database associates these codes with the objects or persons to which the transponders are attached. A cost computer then uses the times of entry and exit of objects or persons, and/or other information, to compute the costs of the activities of the persons and objects.

In addition to tracking movements of caregivers, the system may track objects such as supplies which are consumed during a patient's care, and equipment which is used but not consumed during a patient's care. Each supply is associated with its replacement cost, and this replacement cost is assigned to the activity in which the supply is consumed. (If the supply is not consumed, a restocking charge may be applied for the cost of returning the supply to inventory.) Each item of equipment is associated with a rental cost, and this rental cost is charged to the activity in which the equipment is used.

Costs may be tracked on a per-use or per-activity basis, or on a time basis, or both, whichever is the most accurate measure of the costs of personnel and/or equipment.

In the disclosed particular embodiment, the reader communicates with the transponders via wireless radio frequency communication, and the readers further communicate with the cost computer via wireless radio frequency communication. This permits the readers to be mobile. Thus, a system in accordance with principles of the present invention is used to temporarily track activities in a defined space. To do so, a portable transponder reader is temporarily associated with the defined space, and transmits codes identifying detected transponders via radio frequency communication. Thus, the cost tracking system may be rapidly deployed to rooms where cost-tracking is needed, and moved from room to room as needed to track different kinds of procedures.

The above and other objects and advantages of the present invention shall be made apparent from the accompanying drawings and the description thereof. Specifically, the invention will be illustrated in the context of a particular embodiment and application environment, namely a medical services business such as a hospital. It will be appreciated, however, that principles of the present invention might be applied to other businesses and other environments with equal advantage.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIG. 1 is a block diagram of an activity based cost improvement system in accordance with the present invention;

FIG. 3 is a data structure diagram of a tag reader message communicated from tag readers in the system of FIG. 1;

FIG. 4 is a data structure diagram of a reader location database identifying the locations of tag readers at the installation site;

FIG. 5 is a data structure diagram of a batch database identifying supplies, equipment, patients and caregivers in a particular room at the installation site;

FIGS. 6A, 6B, 6C and 6D are data structure diagrams of a supply tag database, equipment tag database, caregiver tag database, and patient tag database, respectively, which associate a particular tag number with a particular supply, item of equipment, caregiver, or patient, respectively;

FIGS. 7A, 7B, 7C, 7D and 7E are data structure diagrams of an equipment cost/location database, caregiver cost/location database, patient history/location database, supply inventory/cost database, and room information/cost database, respectively, which identify cost and other information for equipment, caregivers, patients, supplies, and rooms, respectively;

FIGS. 8A, 8B and 8C are data structure diagrams for a schedule database, procedure database, and procedure type database, respectively, which identify scheduling for particular rooms and track the kinds and costs of procedures performed in those rooms;

FIGS. 9, 9A, 9B, 9C and 9D are flow charts of operations performed by the computer circuitry illustrated in FIG. 1 interacting with the various databases described in the preceding Figs. to track and store cost information.

DETAILED DESCRIPTION OF SPECIFIC EMBODIMENTS

Figure 2:
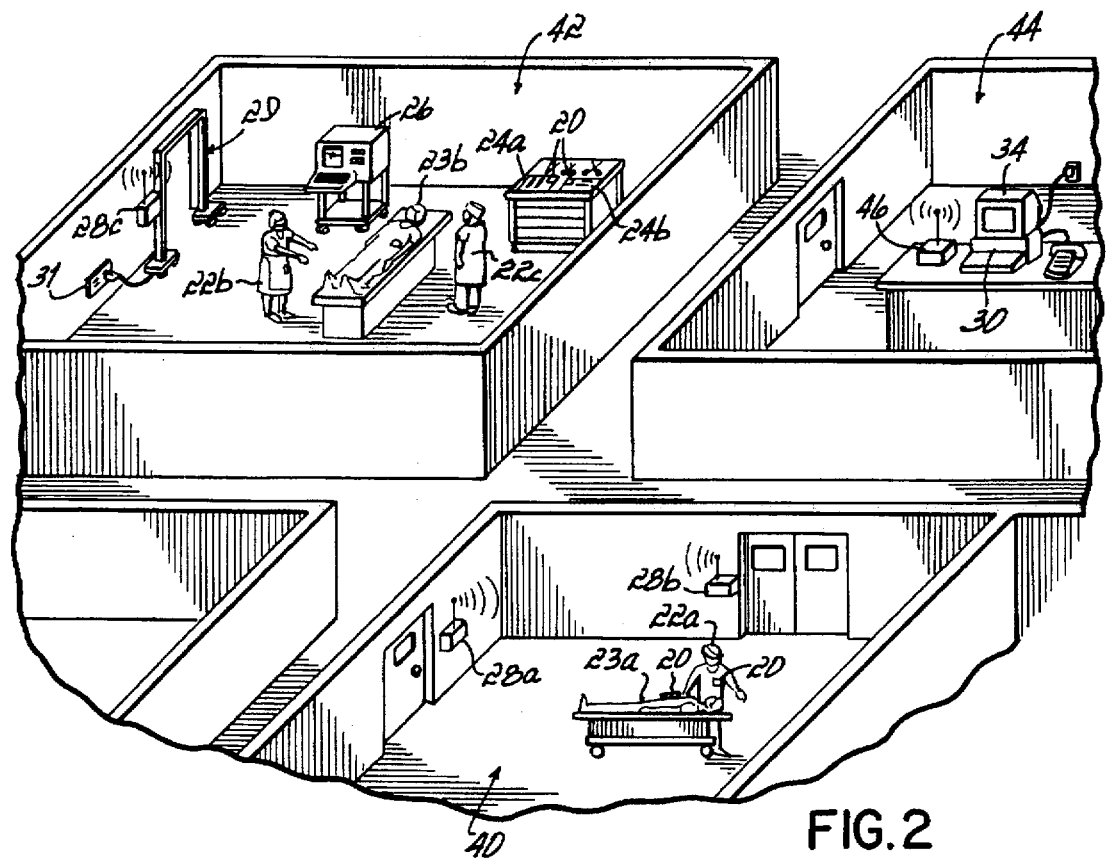
FIG. 2 is a schematic illustration of use of the cost improvement system of FIG. 1 in a hospital.

Now referring to the drawings and particularly FIG. 1 thereof, in accordance with principles of the present invention, transponder tags 20 are associated with each person and object for which costs are to be tracked. That is, in a medical services environment, each care giver 22, each item of supplies 24 and item of equipment 26, used by the medical services business carries a tag 20. Furthermore, for reasons explored in more detail below, patients 23 may also carry tags 20. The identifiers of the tags are associated with the name or type of the person or supply or equipment to which the tag is affixed and this information is stored in databases as discussed in further detail below.

The tags 20 may be any of a number of suitable devices currently available for providing a coded signal identifying the tag 20 upon interrogation from a tag reader 28. A wide variety of reader-tag communication methodologies are known. For example, U.S. Pat. No. 3,929,277 shows a tag and reader system where the tag produces RF pulses equal in number to the tag identifier. U.S. Pat. No. 4,049,950 shows a system in which the tag produces a response at an RF frequency indicative of the tag identifier. U.S. Pat. No. 5,166,676 shows a tag which produces a frequency-shift encoded response indicating the identifier. U.S. Pat. No. 5,173,705 shows a tag with a resonator circuit, where the tag varies the reactivity of this resonator to produce a coded response.

Principles of the present invention might be carried out using tags which can be written and read, for example to establish or alter the tag's code. U.S. Pat. Nos. 4,656,463, 4,857,893, 4,963,887, 5,021,790, and 5,144,314, for example, disclose such read-write systems. A particularly suitable read-write system might use a tag formed of a single semiconductor chip, storing data in anti-fuse memory cells such as those cells shown in U.S. Pat. No. 5,296,722.

Tags may also comprise bar codes affixed to objects and, for example, sewn into a patch on the clothing (e.g., in the shoulder area) of persons to be tracked, in which case the tag readers might be laser scanners of the kind which are conventionally known.

All of the U.S. Patents identified in the preceding paragraphs are hereby incorporated herein by reference in their entirety.

The tag reader 28 communicates with each of the tags 20 as the tags 20 pass within proximity of the reader 28. Through a wireless communication indicated at 27, tag reader 28 obtains the identifying tag number from a tag 20. The tag reader 28 then supplies this identifying tag number to programmed computer circuitry 30 which processes this information in accordance with methods of the present invention, as discussed in substantially greater detail below.

While one tag reader 28 is shown in FIG. 1, it will be understood from the following that in a given implementation, particularly in a hospital or other medical service environment, there may be multiple tag readers, each of which separately communicates with computer circuitry 30 and provides not only tag numbers but also reader identification numbers to computer circuitry 30 so that computer circuitry 30 may evaluate activities at multiple locations within the medical facility or other service business.

Computer circuitry 30 interacts with a number of databases stored in electronic storage device 32. The nature of these databases and the way in which they are used will be discussed in further detail below. Through this interaction, computer circuitry 30 produces detailed cost analysis information which may be reported to an operator through a display monitor 34 or generated on a printer 36. At the same time, computer circuitry 30 may obtain scheduling and procedure information from an operator through a keyboard 38 and/or pointing device 39 interacting with computer circuitry 30 and displays on monitor 34.

Referring now to FIG. 2, the physical locations of the tag readers 28, caregivers 22 and patients 23, supplies 24 and equipment 26 can be better understood. In a healthcare facility, healthcare services are typically provided in one of a number of patient care rooms including, for example, a patient room 40 and an operating room 42. In a patient room, a patient 23a typically rests on a bed and occasionally a caregiver 22a visits the patient to provide patient care services. To monitor the use of the patient room 40 by the patient 23a and to also monitor the entry and exit of the caregiver 22a, tag readers 28a and 28b are positioned adjacent to the entrances and exits from the room 40 (and may be integrated into the doorframes so as to be hidden from view). These readers allow the central computer circuitry 30, which resides in a separate administrative room 44, to detect a caregiver entering and exiting room 40 and when a patient has entered and exited a room. This data is used as discussed below to accumulate caregiver time charges and room rental charges for analysis.

In one embodiment of the present invention, computer circuitry 30 in room 44 may be connected via telephone to a remote computer to transmit cost tracking information to the remote computer as discussed below with reference to FIG. 10.

As can be seen in FIG. 2, caregiver 22a and patient 23a both carry tags 20 affixed to their clothing so that the movements of the caregiver and patient can be monitored. Caregivers' tags may be affixed to sterile gowns donned by the caregivers during each day of work at the patient care facility, or incorporated into identification badges used by staff of the patient care facility. Patient tags may be incorporated into patient wristbands which are, as a standard practice, provided to patients upon admittance to patient care facilities.

In an operating room 42, a patient 23b is provided with healthcare services by typically several caregivers 22b and 22c. In addition, a typical procedure performed in an operating room 42 will make use of various equipment and supplies. For example, an item of equipment 26 may be used to monitor or interact with the patient 23b during the procedure. Furthermore, various supplies 24a and 24b may be used providing services to the patient. The operating room 42 includes at its entrance an additional, portable tag reader 28c which may be formed to simulate a door frame. Thus, the movements of the caregivers, patient, equipment and supplies into and out of the operating room 42 can be accurately monitored by the computer circuitry 30.

In the context of the present description, "supplies" 24 are distinguished from "equipment" 26 in that supplies 24, once consumed, are not reused for providing services, whereas equipment may be repeatedly reused for different patient procedures. As one example, the equipment 26 may be a electrocardiograph for monitoring the vital signs of a patient, and the supplies 24 may be disposable tubing and sponges, or custom procedural trays which are specially assembled for the procedure performed in operating room 42. There are, however, some supplies which can be restocked if not used during a procedure, for example an orthopedic appliance such as a replacement hip joint. As will be noted below, in some instances supplies of this kind are removed from inventory and brought into a room during a procedure, but then are not used and are restocked in inventory for later use. Restockable supplies of this kind are specially handled and associated with a restocking cost which is charged when activity indicating restocking of the supply is detected.

As can be seen from FIG. 2, each of the persons and items of equipment and supply in room 42 carries a tag 20. These tags 20 are detected by reader 28c when the person or item of equipment or supply enters the operating room 42. From the information obtained from reader 28c, computer circuitry 30 may determine the cost of the procedure provided to the patient in operating room 42 by accumulating the labor cost of caregivers, rental cost of equipment used, and cost of supplies consumed, combined with any rental expenses associated with the operating room 42 and any fixed equipment in that room.

As can be seen in room 44 (and as also shown in FIG. 1), computer circuitry 30 is associated with a monitor 34 for displaying information, and may also be associated with a printer 36, keyboard 38 and pointing device 39.

Computer circuitry 30 and the associated equipment is stored in an administrative room 44 separate from the patient rooms and operating rooms of the patient care facility, and data collected in the other rooms is transmitted to the administrative room 44 for logging into the computer circuit 30.

Data may be transmitted from tag readers 28 in various rooms via hard-wired connections running through the walls, ceilings or floors of the patient care facility and leading to the administrative room 44. Such a connection could be used in a permanent cost tracking system. In such an implementation, the readers 28 might be built into the door frame of rooms to be monitored.

However, in many situations, it may be preferable to track costs for selected rooms over a brief period of time and move the tag readers 28 regularly about the patient care facility or from one facility to another to monitor desired procedures and/or other services rendered of particular interest. In this situation, the tag readers 28 may wirelessly communicate with a central receiver 46 located in the administrative room 44. In this embodiment of the present invention, each tag reader 28 is provided with a transmitting antenna, and produces RF signals which are transmitted wirelessly to a receiving antenna at receiver 46. Receiver 46 then provides the content of the tag reader signals to computer circuitry 30 for processing in the manner described below.

A portable tag reader is shown, for example, in operating room 42. The tag reader includes a wheeled portal 29, to which the tag reader 28c is attached or integrated. This wheeled portal may be readily moved into a room and positioned at the doorway of that room to commence cost tracking. The tag reader 28c may be battery powered, or alternatively may be plugged into a nearby wall outlet 31 when the movable reader is installed.

By positioning portable tag readers 28 at the doorway of the selected room, the system of the present invention might be used, for example, to track the costs associated with all surgical procedures performed at a given healthcare facility. The resulting data might be used to compare the efficiency of various types of procedures for curing the same ailment as well as comparing the efficiency of various individuals or teams of caregivers in providing the same healthcare service. The information obtained in this manner can be extremely useful in determining which of several candidate procedures should be adopted and made part of best practice guidelines for treating a given ailment, and also in determining which physicians or other caregivers are efficient or inefficient in providing patient care services.

Now turning to the specific formats of information transmitted and manipulated by the system of the present invention, FIG. 3 illustrates a message received by computer circuitry 30 from a tag reader 28. In substance, the message includes a tag reader number 50 identifying the tag reader from which the message has been transmitted, and a tag number (code) 52 which has been read from a tag detected by the tag reader 28.

The reader messages are used in conjunction with a reader location database shown in FIG. 4, which identifies the locations of the tag readers. The reader location database includes a number of records 54, each of which identifies the room location of a tag reader. Each record 54 includes an entry 50 identifying a tag reader number and an entry 56 identifying the room in which that reader is installed. Additional databases are used to provide further information about the room identified by entry 56 in record 54, as discussed in further detail below with reference to FIG. 7E.

As tags are detected entering and exiting rooms in the patient care facility, computer circuitry 30 accumulates information on the locations of the tags and the times at which they were detected. This information is accumulated in a batch database, illustrated in FIG. 5. The batch database includes a number of records 58, each of which is associated with one of the rooms monitored by one or more tag readers 28. Each of these records 58 includes an entry 56 identifying the room for that record, using the same room ID as is used in the reader location database of FIG. 4 and in other databases discussed below. In addition, the batch database may include several additional entries of various kinds to describe the persons and objects which have been detected entering and exiting the room by tag readers 28.

In particular, the batch database record 58 may include a patient entry 60, which identifies a patient who has been detected entering the room. The patient entry 60 includes a field 62 indicating the tag number for the patient, a field 64 indicating the time that the patient was detected entering the room, and a field 66 indicating the elapsed time that the patient has been in the room. This information is manipulated as discussed below to associate activities in the room with a particular patient.

Batch database records 58 may also include one, or typically a plurality of caregiver entries 68. Each caregiver entry includes a field 70 identifying the tag number of a caregiver who was detected entering the room, and a field 72 indicating the elapsed time that the caregiver spent in the room. Following field 72 are a sequence of fields 74a/75a, 74b/75b, 74c/75c which identify times when the associated caregiver entered and exited the room.

A batch database record 58 may further include one or more equipment entries 76. Each equipment entry includes a field 78 identifying the tag number for the equipment, which was detected when the equipment entered the room, a field 80 indicating the time that the equipment most recently entered the room and a field 82 indicating the time elapsed while the equipment was in the room.

Finally, a batch database may include one or more supply entries 84 associated with supplies which have been detected entering the room. Each supply entry includes a field 86 indicating the tag number for the supply which was detected entering the room, and a field 88 storing a flag indicating whether the supply has been restocked. The purpose and use of field 88 will be discussed in further detail below.

When a tag is detected entering or exiting a room by a tag reader 28, computer circuitry 30 makes use of one of the four databases illustrated in FIGS. 6A–6D to determine what person or object entered the room attached to the tag 20.

As seen in FIG. 6A, tags attached to supplies are identified in a supply tag database, which includes multiple records 90. Each record 90 is associated with one tagged supply, and includes a field 92 for identifying the tag number of the tag attached to the supply, a field 94 for indicating an identifier for the source (i.e., manufacturer) of the supply, a field 96 containing an identifier indicating the type of the supply. This information is used in connection with the inventory/cost database discussed below with reference to FIG. 7D to specifically identify the supply and the cost thereof. In addition, the supply tag database record 90 includes a flag 97 indicating whether the supply has been "costed", i.e., charged to a patient and assumed to be consumed in supplying services to that patient (this last field will be explained in greater detail below).

As seen in FIG. 6B, each item of equipment is identified in an equipment tag database, by one of a number of records 98 in that database. Each record in this database includes a field 100 identifying the tag number for the tag attached to the item of equipment, and a field 102 including an identifier for the item of equipment attached to that tag. This equipment identifier in field 102 is used in connection with the equipment cost/location database discussed below with reference to FIG. 7A to obtain further information about the item of equipment, including its cost.

Referring to FIG. 6C, each tag carried by one of the caregivers is identified and associated with the caregiver by a caregiver tag database. This database includes a number of records 104, each of which identifies a caregiver and his/her associated tag number; field 106 identifies a tag number and field 108 indicates the identifier for the caregiver wearing that tag. The caregiver identifier in field 108 is used in connection with a caregiver cost/location database discussed below with reference to FIG. 7B to obtain additional information about the caregiver, including the cost of the caregiver on a per-hour or per-visit basis (fields 146 and 148).

Referring to FIG. 6D, each patient wearing a tag on a wristband or elsewhere, is associated with the tag number in patient tag database. This database includes a number of records 110, each of which associates a patient with a tag number. Each record 110 includes a field 112 identifying the tag number for the tag and a field 114 storing an identifier for the patient. The patient identifier found in field 114 is used in connection with a patient history/location database discussed below with reference to FIG. 7C, to obtain additional information about the patient including the patient's diagnosis and location and various procedures that the patient has undergone or is scheduled to undergo.

Now referring to FIGS. 7A–7E, cost and other information is stored by computer circuitry 30 and used to accumulate the costs of personnel and objects used in a service provided to a patient. To this end, the equipment cost/location database illustrated in FIG. 7A includes a number of records 116, each of which is associated with a particular item of equipment. Each record begins with an equipment identifier field 102 containing the identifier for the item of equipment, followed by a number of fields describing the item of equipment. These fields notably include a field 118 identifying a rental cost for the equipment on an hourly basis and a field 120 indicating the cost of the equipment on a per use basis. Fields 118, 120 are used to determine the cost of using an item of equipment in a patient care procedure when the equipment is detected entering a patient room during a procedure.

Additional information about an item of equipment may also be stored in the equipment cost/location database. For example, a text field 122 may store a textual name for the item of equipment, which can be used to display or print the name of the equipment for operators who wish to evaluate dam on that equipment.

In addition, a field 124 may be used to store a room identifier for the room in which the equipment was most recently detected. This room identifier may then be used by computer circuitry 30 to locate the equipment when it has become lost at the healthcare facility.

Additional purchase and maintenance information may be stored to facilitate computing the cost of the equipment and also to facilitate maintenance of the equipment. For example, a field 126 may indicate the cost of the equipment when it was purchased, and a field 128 may indicate the date on which the equipment was purchased.

Maintenance information may be stored in additional fields, such as field 130 which identifies the number of times the equipment has been used, field 132 which indicates the total time that the equipment has been in use, field 135 indicating the accumulated maintenance costs to date, and field 137 indicating the useful lifetime of the equipment, such as the amortization period for the equipment.

Finally, fields 139, 141 and 143 may be used to indicate the time of the next scheduled periodic maintenance. Field 139 may indicate a date for which the next periodic maintenance should be undertaken. If the number of uses of the equipment is relevant to its maintenance schedule, field 141 may indicate a number of uses at which periodic maintenance should next be undertaken. If the total time of use of the equipment is relevant to its maintenance schedule, field 143 may indicate the total time of use at which periodic maintenance should be performed.

Fields 124, 130 and 132 relating to maintenance and the location of the equipment are updated as the equipment is detected in use in the healthcare facility by computer circuitry 30. Thus, the system of the present invention not only provides cost tracking, but also provides useful maintenance and location tracking for equipment at the healthcare facility.

Figure 7A:
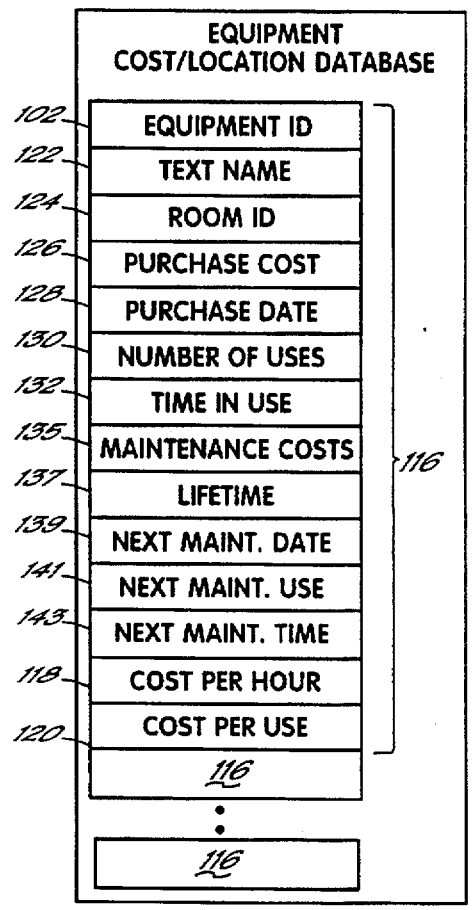
Figure 7B:
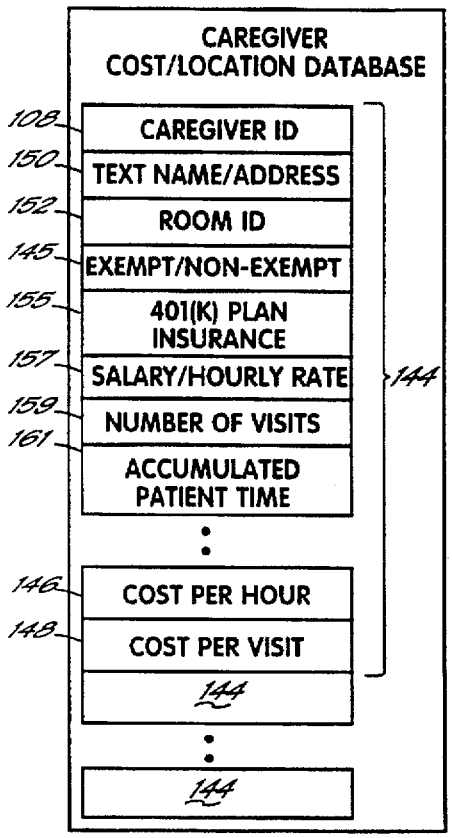

Referring now to FIG. 7B, detailed information on each caregiver at the healthcare facility is stored in a caregiver cost location database. This database includes a number of records 144, each of which includes the identifier for a caregiver in a field 108 and associates with that caregiver various data relating to the caregiver.

In particular, the caregiver is assigned a cost per hour which is stored in a field 146 and a cost per patient visit which is stored in a field 148. These cost figures are used by computer circuitry 30 to determine the costs associated with a visitation by a caregiver with a patient.

In addition, the record 144 may include other information regarding the caregiver, including a field 150 for storing a text name and/or address for the caregiver to be used when displaying information relating to the caregiver for an operator.

Also, record 144 may include a room identifier field 152 for storing the identifier of a room where the caregiver was last detected. This information can then be used to locate a physician or other caregiver when their location is unknown.

Additional compensation and salary information may also be stored in the record 144 including, for example, a field 145 indicating whether the caregiver is an exempt (salaried) or non-exempt employee. In addition, a field 155 may indicate the retirement plan and health insurance or other insurance plans of the employee. Field 157 may indicate the employee's salary or hourly rate. This information may be useful in determining the exact cost of the employee's time on a per hour basis.

Furthermore, to facilitate adjustments in the hourly cost figures, the record 144 may include fields describing the performance of the caregiver. Specifically, a field 159 may indicate the number of patient visits made by the caregiver during a given day, and a field 161 may indicate the accumulated time that the caregiver spent with patients during a given day. As this data is accumulated, it may be used in connection with the salary or hourly information to determine the cost of the caregiver's time and/or the cost of a visit by the caregiver to a patient at the healthcare facility. This information may also be used to compare the performance of individual caregivers and their relative costs.

The performance information collected in fields 159 and 161 is accumulated by computer system 30 as activities are tracked at the healthcare facility, in a manner similar to the data accumulated in fields 130 and 132 of the equipment cost/location database illustrated in FIG. 7A. The exact manner in which this data is collected will be explored in further detail below.

Figure 7C:
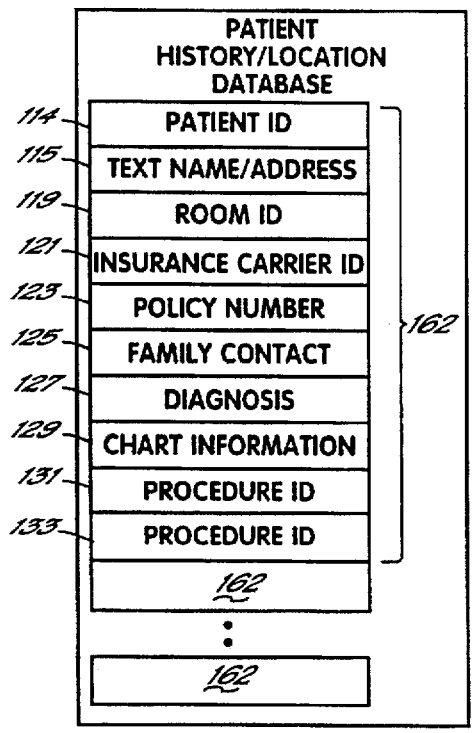

Referring to FIG. 7C, patient information useful for tracking and evaluating the care provided to a given patient may be stored in a patient history/location database. This database comprises a number of records 162, each record associated with one of the patients at the healthcare facility.

Each patient history/location record begins with a patient ID field 114 including the identifier for a patient. In addition, record 162 includes a field 115 including the text name of the patient and the patient's address or other text information relating to the patient. There is also a field 119 including a room identifier indicating the last room in which the patient was detected. This information may be used to locate a patient who has become lost at the healthcare facility.

Various additional information about the patient and his/her financial and treatment information may be stored in record 162. For example, field 121 identifies the patient's insurance carrier, and field 123 indicates the insurance policy number. Field 125 indicates one or more family members related to the patient. Diagnostic information includes a field 127 for indicating a diagnosis of the patient's ailment, and a field 129, or multiple such fields, indicating information from a patient's diagnostic chart and its evolvement over time. Finally, record 162 may include multiple fields such as 131 and 133 indicating the identifiers for procedures that the patient has undergone as part of his treatment at the healthcare facility. These identifiers reference records in the procedure database discussed below with reference to FIG. 8B.

The information relating to the location of a patient and the procedures undergone by the patient is updated through the course of a day by computer circuitry in response to activities detected at the healthcare facility or data entered into computer circuitry by an operator using keyboard 38 and/or pointing device 39, as discussed in further detail below.

Figure 7D:
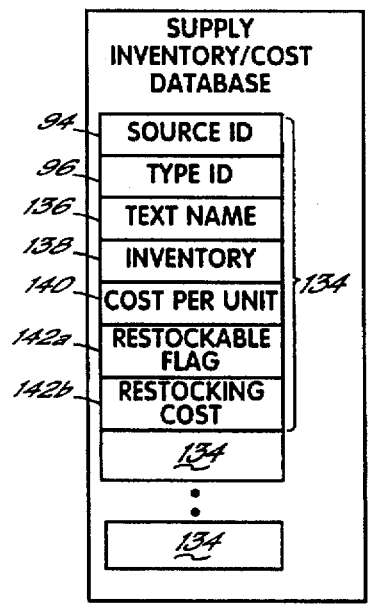

Referring now to FIG. 7D, supplies consumed at the healthcare facility are described in a supply inventory/cost database. This database includes a number of records 134, each of which is associated with a particular type of supply used at the healthcare facility. Each record 134 identifies the source (manufacturer) of the supply in a field 94, and the particular type of the supply in a field 96. A text name for the supply is provided in field 136, useful for identifying the supply to an operator in a printed report or display.

The body of the record includes a field 140 identifying the cost of the supply. This is the replacement cost of the supply, and may be the purchase cost of the supply if it is disposable, or the cost of creating the supply if it is assembled at the patient care facility (as in the case of a custom procedure tray). As will be seen below, the cost identified in field 140 is charged to the cost of a procedure when a supply is consumed by that procedure, as determined in the manner discussed below.

Record 134 also includes fields 142a and 142b for tracking the cost of restocking supplies which are retrieved from inventory to be available during a procedure, but then are not used and must be restocked. An example is an orthopedic replacement joint. In some cases, several replacement joints of different sizes may be pulled from inventory and made available in the operating room, and after one joint of the right size has been selected and installed, the others are restocked. The cost of restocking the unused supplies can be an important component of the overall cost of the procedure. Accordingly, records 134 include a field 142b indicating the cost of restocking a supply if the activities detected indicate that the supply is being restocked.

There are some supplies which are never restocked, and are considered used immediately upon entry into a patients room whether they are in fact used. One example is a custom procedure tray, which is assumed used and not sterile once it has entered a patient's room. To account for supplies of this kind, records 134 include a field 142a containing a flag indicating whether the associated supply is restockable, or alternatively should be considered used whenever the supply is detected entering a patient or operating room. The use of this flag, and of the cost fields 140 and 142b identified above, will be discussed in further detail below.

Other supplies management information might be stored in records 134. For example, record 134 indicates, in field 138, the number of this particular supply currently in inventory at the healthcare facility. The inventory information in records 134 is updated as supplies are detected being consumed in patient care procedures. Inventory information may be used to determine when the supply must be reordered and the source and type identifiers in fields 94 and 96 may be used to identify the vendor of the supply and to order additional supplies, using additional ordering databases that might be stored in computer circuitry 30 (not shown in FIG. 7D).

By maintaining a timely, accurate record of inventory and consumption of supplies, the system of the present invention may facilitate cost-reducing inventory management schemes such as just-in-time inventory. Furthermore, because the re-ordering process can be automated, response times for restocking can be dramatically reduced, reducing the likelihood of shortages.

Referring now to FIG. 7E, information on particular rooms at the healthcare facility and their cost may be storm in a room information/cost database. This database includes a number of records 147, each of which is associated with a particular room at the healthcare facility. Each record 147 includes a field 56 indicating the identifier of the room described in the record 147. Following the room identifier are various fields relating to the room, including a text field 149 which can be used to display the room name to an operator in a printout or on a computer screen. In addition, field 151 indicates a computed cost per hour or per day for the use of the room identified in the record 147. Finally, field 153 of record 147 indicates the type of procedure, if any, which is normally performed in the identified room.

Rooms which are equipped with fixed equipment for common procedures, e.g., dialysis, identify a dialysis procedure type in field 153 so that any activity detected in that room is assumed to be a dialysis unless otherwise indicated in the databases accessed by computer circuitry 30. (The procedure type identifier found in field 153 of record 147 refers to a procedure type identifier in the procedure type database discussed below with reference to FIG. 8C.) The manner in which computer circuitry 30 determines what type of procedure is being undertaken in a room will be discussed below in further detail.

The costs of fixed capital/equipment installed in a room (e.g., a MRI machine), are tracked by storing a room cost in field 151 which approximates the per-hour or per-day cost of this item of fixed equipment. Accordingly, such fixed equipment is not tagged or tracked by readers, but is cost-tracked through the entries in the room information cost database.

The tag databases discussed with reference to FIGS. 6A–6D and the cost and other information databases discussed in FIGS. 7A–7E must be initialized prior to beginning cost tracking to facilitate proper operation of the cost tracking system described in FIG. 1. In particular, each person and item of supplies or equipment to be tracked by the system must be supplied with a tag 20 and the computer circuitry 30 must be used to add records to each of the databases in FIGS. 6A–6D, associating the tag number with the individual or item of supplies or equipment to which the tag is attached. Furthermore, the operator of the computer circuitry 30 must initialize each of the databases in FIGS. 7A–7E with information regarding individuals and items of equipment, rooms at the facility, and kinds of supplies, to enable the computer circuitry 30 to later automatically determine the type of a supply or equipment or individual and the cost of that supply, equipment or individual. The manner in which this data is initialized will not be discussed in substantial detail herein, as it may be performed through well known data entry procedures which are supported by any number of commercially available database software packages. Commercially available database software packages may also be used to define the forms for each of the records in the databases described in FIGS. 6A–8C, and then used to create records consistent with these forms storing the appropriate data for use by the computer circuitry 30.

To enable computer circuitry 30 to associate activities undertaken in a given room and detected by tag readers 28 with particular patient procedures, computer circuitry 30 must also have access to basic scheduling information for procedures scheduled to be undertaken at the healthcare facility. This information is stored in the databases described in FIGS. 8A–8C.

Figure 8B:
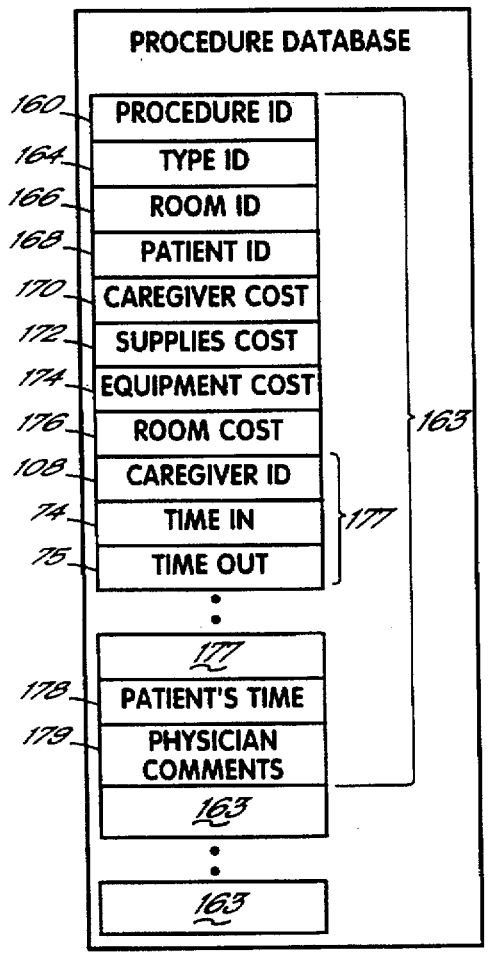

In particular, referring to FIG. 8A, a schedule database includes a sequence of records 154, each of which schedules a patient care activity (procedure) to be undertaken at a room at the healthcare facility. Each record 154 includes a field 56 for identifying the room in which the scheduled activity is to be undertaken, a field 156 identifying the time at which the activity is to be undertaken, and a field 158 indicating the time at which the activity is completed. Further, each record 154 includes a patient identifier in a field 114 indicating the patient who will undergo the procedure, and a procedure identifier in a field 160. The patient identifier in field 114 and procedure identifier in field 160 are used to reference a particular patient record from the patient history/location database of FIG. 7C, and to reference a particular procedure in the procedure database discussed below in FIG. 8B.

The system of FIG. 1 uses the information in a record 154 to determine which procedure is being performed in a room based upon activity detected in that room, and thereby can determine when the procedure has begun and when the procedure is concluded. As discussed in further detail below, when a procedure is concluded, field 158 is supplied with the time at which the procedure was completed so that the schedule database is automatically updated to indicate which procedures have and have not been completed.

As noted above, entries 154 in the schedule database refer, using field 160, to procedures identified in the procedure database. Referring now to FIG. 8B, the procedure database includes a number of records 163, each of which describes and is associated with a particular patient procedure which is performed in a room at the healthcare facility. Each procedure record begins with a field 160 containing a unique procedure identifier, which identifier is also used in a schedule record 154, field 160, to associate a scheduled event with a procedure, and which is also used in patient history records 162 in fields such as 131 and 133 to identify procedures that have been performed on a patient.

Each procedure record 163 includes various fields for describing the procedure that was performed or is to be performed. In particular, the records include a field 164 storing a type identifier indicating the type of the procedure which is to be performed. This type identifier references a procedure type record in a procedure type database discussed below with reference to FIG. 8C. In addition to the type identifier in field 164, each procedure record 163 includes a room identifier 166 identifying the room in which the procedure is or was performed. Further, the record 163 includes a patient identifier 168 indicating the patient upon whom the procedure was performed.

Following these fields, the procedure record 163 includes fields for identifying the various costs associated with the procedure. In particular, a field 170 identifies the caregiver labor cost, a field 172 identifies the cost of supplies consumed, a field 174 indicates the cost of equipment used during the procedure, and a field 176 indicates the cost for the room used during the procedure. The cost figures in fields 170–176 are generated automatically by computer circuitry 30 by detecting the activity in the room and referencing the cost information supplied in the databases of FIGS. 7A–7E, as discussed in further detail below. When a procedure record is initially created, these cost fields 170–176 are left blank.

To provide complete information on the manner in which a procedure was performed, procedure record 163 includes multiple entries 177, each identifying the activities of a caregiver during the procedure. Specifically, entries 177 include a field 108 storing a caregiver's identifier, followed by a number of fields 74 and 75 indicating the times at which the caregiver entered and exited the room during the procedure. This information provides a complete record of which caregivers were involved with the procedure and when they were in the room participating in the procedure.

A field 178 in the procedure database indicates the time that the patient spent in the room where the procedure was performed. This time might be compared to the total time consumed by caregivers during the procedure to evaluate the efficiency of the use of personnel during the procedure.

The procedure database records 163 may also indicate additional information relating to a procedure, such as the success or failure of the procedure, or any notes relating to the way in which the procedure was performed, or any unusual conditions detected during the procedure. This information may be placed in one or more text fields such as 179 to be completed by a physician or other caregiver who was involved with the procedure.

Figure 8C:
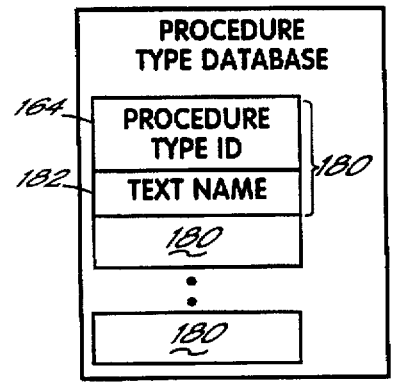

Referring now to FIG. 8C, as discussed above, the procedure type database is used to identify specific procedure types. The database includes a sequence of records 180, each of which relates to a particular type of procedure. Each record 180 in the procedure type database indicates the identifier for the procedure type in a field 164 and a textual name for the procedure type in a field 182.

Because procedure records 163 and schedule records 154 refer to procedure types using identifiers, records 163 and 154 are made substantially smaller, because there is no need to store textual procedure names. Furthermore, the use of predefined procedure type names aids in standardizing the descriptions for procedures, so that procedures and their costs can be more easily compared.

To schedule a procedure for completion in a room, an operator uses keyboard 38 and/or pointing device 39 shown in FIG. 1 to create a schedule record 154 identifying the room (field 56) and time (field 156) at which the procedure is to occur, and also the identifier for the patient (field 114). At the same time, the operator creates a procedure record 163 having a unique procedure identifier, which identifier is stored in the schedule record 154 (field 160), and in the procedure record 163 (field 160). Then, the operator fills in the new procedure record, storing the appropriate procedure type identifier (field 164), and copying the room identifier (field 166) and patient identifier (field 168) stored in the schedule database record 154. Thus, the normal task of scheduling a procedure for a room, which involves identifying only a few items of information, also prepares the databases to permit cost tracking.

Further specific information about a procedure is accumulated in the other fields in a procedure record 163 automatically, by computer circuitry 30, as it tracks activity in the appropriate room, as discussed below. Upon completion of a day's activities or a number of days' activity, the procedure database will include a number of records 163, each of which identifies not only the procedures performed in a room but also the costs of those procedures and the manner in which they were performed. This information can then be used to collect and report upon the costs of particular procedures and break down these reports in accordance with the rooms used, the particular patient, the particular procedure type, or the caregivers involved in the procedure. These detailed reports can be extremely useful in determining the actual cost of a particular type of procedure, for determining which procedures have been performed efficiently or inefficiently, or for determining the efficiency of a particular caregiver or group of caregivers.

Figure 9D:
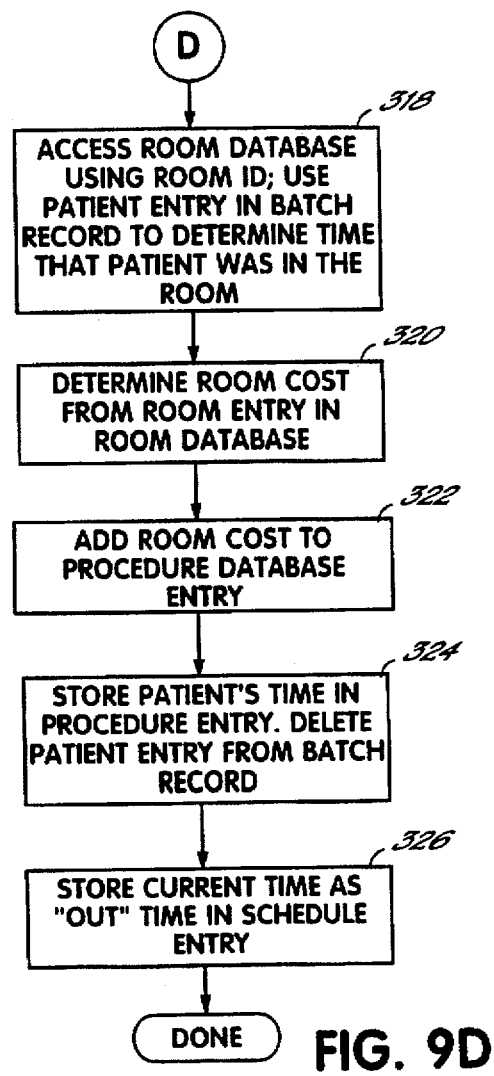
Figure 9:
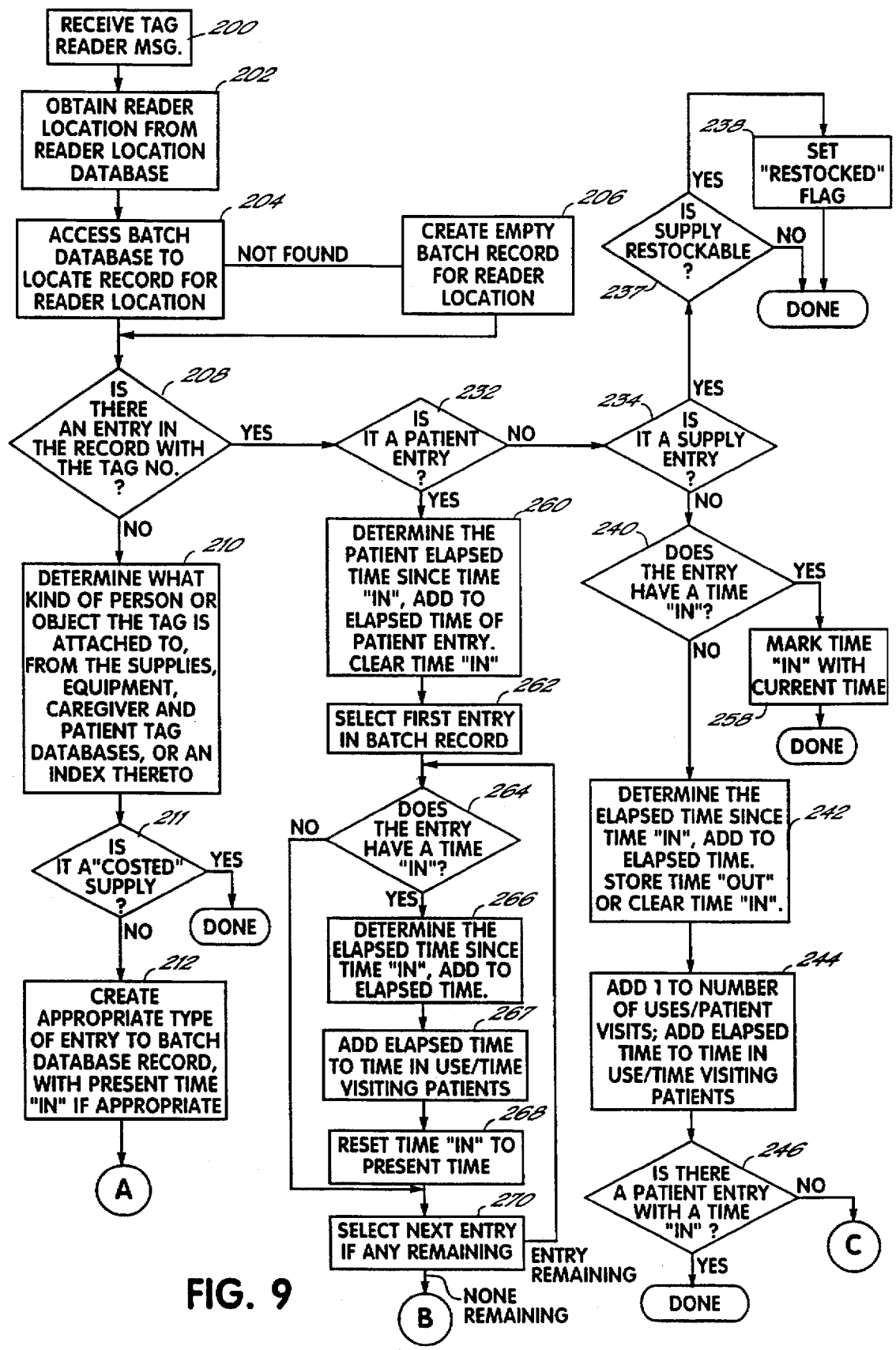

Referring now to FIG. 9, the operations performed by computer circuit 30 during daily operation of the cost tracking system of FIG. 1, are initiated by the receipt of a tag reader message in step 200. Upon receipt of a tag reader message, computer circuit 30 obtains 202 location of the tag reader which produced the tag reader message. This is done by accessing the reader location database illustrated in FIG. 4 and locating a record 54 having the same reader number as the reader number appearing in the received tag reader message. The room identifier in this record 54 indicates the location of the tag reader.

Next, computer circuit 30 accesses 204, the batch database (FIG. 5), to locate the batch record 58 for the room containing the reader. If such a batch record is found, then the computer circuitry proceeds to step 208. However, if no batch records are found, then computer circuitry 30 creates an empty batch record (step 206) for the room containing the tag reader and stores the room identifier into the new batch record (field 56).

After a batch record has been located or created, in step 208 computer circuitry 30 reviews the entries 50, 68, 76, 84 in the batch record to attempt to locate an entry having the tag number identified in the tag reader message (step 208).

When a tag is detected by a tag reader, the person or object carrying the tag may be entering or exiting the room whose doorway is monitored by the tag reader. A batch record will include an entry having a tag number only if that tag number has previously been detected by the tag readers in that room. If there is no such entry, then the tag is initially entering the room. In this situation, computer circuitry 30 will proceed from step 208 to step 210, in which computer circuitry 30 determines what kind of person or object the tag is attached to. To do this, computer circuitry 30 references the supply, equipment, patient and caregiver tag databases discussed above in FIGS. 6A–6D, to locate a record in one of those databases having the tag number identified in the tag reader message. (An index to the four databases of FIGS. 6A–6D might be created and used to expedite this step.) When the record is located, the computer circuitry then reads the additional information in the record to determine which specific supply, equipment or caregiver to which the tag is attached.

Next, computer circuitry 30 proceeds to step 211, in which computer circuitry 30 determines whether the tag is attached to a "costed" supply. In this step, computer circuitry 30 determines whether the tag is attached to a supply, and if so, whether that supply has been marked as "costed" in field 97 of the supply tag database of FIG. 6A.

If field 97 is marked "costed", then the supply has been charged to a procedure performed on another patient. If this is the case, then the item of supplies should not be charged again. It may be the case that the supply has been collected in a waste container along with its tag, and a sanitation crew has carried this waste container into a patient care room during regular clean-up rounds. It may also be that the supply was not in fact used in the prior procedure and has (appropriately or inappropriately) been recycled for use in another procedure. In either case, the supply should not be charged twice to two different procedures. Therefore, if field 97 of the supply tag entry 90 is marked as "costed", then computer circuitry 30 will end its processing and will not create an entry 86 for the supply in the batch database of FIG. 5.

However, if field 97 of the supply tag entry 90 is not marked as "costed", the supply should be charged to the patient who is undergoing the new procedure. Therefore, if the prior entry is not marked as "costed", computer circuitry 30 proceeds to step 212.

In step 212, computer circuitry 30 creates the appropriate type of entry 50, 68, 76 or 84 for storage into the batch database record 58, to indicate for future reference that the tag has been detected entering the room, and the object or person to which it was attached.

If the tag is attached to a patient or item of equipment, the new batch database entry indicates the time at which patient or equipment is detected entering the room. This time is stored in field 64 or 80, as appropriate. Also, the elapsed time in the new entry is initialized with a zero elapsed time (field 66 or 82) indicating that the patient or equipment has just entered the room and has not elapsed time.

If the tag is attached to a supply, then in step 212, a supply entry 84 is added to the batch database 58. The "restocked" flag (field 88) of the new entry is initially cleared.

If the tag is attached to a caregiver, then, as before, the caregiver's elapsed time is initialized to a "0" value. At the same time, a field 74a in the caregiver entry 68 is initialized with the time that the caregiver was detected entering the room.

Now referring to FIG. 9A, after creating and initializing the appropriate kind of entry in the batch database in the manner described above, computer circuitry 30 proceeds to step 214 in which computer circuitry 30 determines whether there are any other batch records 58, anywhere in the batch database, indicating that the person, supply or equipment is in another room, and if so, corrects the other batch record. (It may occur that a person or object is erroneously not detected when entering or exiting a room. If this occurs, there will be an error in the batch database, which would cause the computer circuitry to create erroneous charges. Situations of this kind can, however, be detected and rectified, as noted.)

In step 214, computer circuitry 30 locates any other batch database records having an entry with the recently-detected tag number. If such an entry is located in another batch record, computer circuitry 30 then proceeds to step 216 or 224 to evaluate that other entry and/or take the appropriate action.

Specifically, if the other batch entry is a caregiver, patient, or equipment entry, computer circuit 30 proceeds to step 216 to determine whether the other batch entry indicates that the person or equipment is in another room. This is determined by searching (in the case of a patient or item of equipment) for a time "in" in a field 64 or 80 of the other entry, or (in the case of a caregiver) searching for a time "in" in a field 74a, 74b, 74c etc. of the other entry which is not associated with a time "out" in a field 75a, 75b, 75c, etc. If there is a time "in", then the other entry erroneously indicates that the person or object is in another room. Computer circuitry 30 corrects this erroneous indication by proceeding to step 218 and clearing the time "in" field 64, 80 or 74 of the other batch record 58. This eliminates the erroneous indication that the person or equipment is still in another room.

A slightly different procedure is followed for tagged supplies. If the computer circuitry 30 has detected a supply entering a room, and the review in step 214 locates another batch record including an entry for the same supply, then computer circuitry 30 proceeds to step 224. In step 224, computer circuitry 30 reads the "restocked" flag in field 88 of the other supply entry. As will be explained below, if the "restocked" flag is set, this indicates that the supply was previously restocked, in which case it is consistent that the supply would later be detected entering another room. However, if the "restocked" flag in the other supply entry is clear, this indicates that the supply is still in another room, which is inconsistent. Accordingly, if the "restocked" flag in the other supply entry is clear, computer circuitry 30 eliminates this inconsistency by deleting the entry for the supply in the other batch record.

After the preceding steps 216–224, computer circuitry 30 returns to step 214 to attempt to locate any other records with the same tag number. Only when no additional records with the same tag number are found in the batch database, computer circuitry proceeds to step 226.

Step 226 and the following steps are used to track the locations of persons and equipment in the healthcare facility. Supply locations are not tracked, and therefore, if computer circuit 30 has detected a supply entering the room, step 226 is the last step in the processing of that event. However, if a person or object other than a supply has been detected, computer circuit 30 proceeds to step 228 at which it accesses the appropriate one of the equipment, caregiver or patient databases (FIGS. 7A, 7B, or 7C, respectively). To do so, computer circuitry 30 uses the identifying information obtained in step 210 (from one of the equipment, patient or caregiver tag databases, FIG. 6B, 6C or 6D, respectively) to locate a record for the item of equipment, caregiver or patient in one of the databases of FIGS. 7A, 7B or 7C, respectively.

Once the appropriate record has been located, computer circuit 30 stores 230, in field 124, 152 or 119, the room identifier for the room in which the tag reader detected the equipment, caregiver or patient, respectively. By so doing, computer circuit 30 provides an update on the location of the equipment, caregiver or patient, which can be used to locate the equipment, caregiver or patient. After updating this information, computing circuit 30 is finished with processing the received tag reader message.

After a tagged object or person has entered a room, if the tagged object or person exits that room, the tag reader in the room will detect the exit of the object or person and generate a subsequent tag reader message such as is shown in FIG. 3. This new message will be received by computer circuit 30 which will proceed through the steps illustrated in FIG. 9 up to step 208, as discussed above. However, at step 208, computer circuit 30 will identify the previously created entry for that tag number in the batch database, and as a result will proceed from step 208 to step 232 and the following steps.

In these steps 232 and the following steps, computer circuit 30 determines what kind of object or person has been detected exiting the room and takes the appropriate action to update the databases managed by computer circuit 30.

If a supply is detected exiting the room, then computer circuitry 30 will proceed from step 232 through step 234 and to steps 237-238 to deal appropriately with the entry for that supply in the batch record 58. As noted above, the presence of a supply entry 84 in the batch database indicates that the identified supply entered the room at some prior time. However, it should be noted that whenever a patient departs a room after a procedure, supply entries appearing in the batch database are deleted, and at the same time the costs of the identified supplies are associated with the procedure performed on the departing patient (see steps 284 et seq., discussed below). Since the departure of a patient causes supply entries to be deleted, the only circumstances which would cause computer circuitry 30 to arrive at step 237, is the entry of a supply into the room, and then exit of the supply from the room, before a patient departs the room. Such activity may indicate one of two things. It may indicate that the supply was brought into the room for potential use on the procedure, but it was not used and then was restocked for re-use with another patient. On the other hand, such activity may also indicate that the supply was consumed during the procedure.

As is noted above, in the supply inventory/cost database, every supply is characterized as "restockable" or not "restockable". Supplies which are not "restockable" are assumed to be consumed whenever they enter a patient's room, whereas supplies which are "restockable" are only assumed to be consumed if the activities relating to the supply suggest that the supply was consumed.

In accordance with this categorization of supplies, in step 237, computer circuitry 30 first determines whether the supply identified by the supply entry is a "restockable" supply. (This involves accessing a record 90 in the supply tag database (FIG. 6A) using the tag number, and retrieving from that the source and type identifiers for the supply (fields 94 and 96), and then using these source and type identifiers to access a record 134 in the supply inventory/cost database (FIG. 7D), and checking the "restockable" flag in field 142a of the record 134.) If the supply is "restockable", then computer circuitry 30 proceeds to step 238 and sets the "restocked" flag in the supply entry 84 in the batch database. This indicates that the supply was restocked (so that later, when the patient departs the room, the appropriate restocking charge can be applied to the procedure undertaken in the room - see steps 284 et seq., discussed below). However, if the supply is not "restockable", then the supply entry in the batch database is not modified (so that later, when the patient departs the room, the full cost of the supply is applied to the procedure undertaken in the room). In either case, after step 237 or 238, processing is completed.

Returning to step 232, if a tag reader message identifies the departure of a caregiver or item of equipment from a room, computer circuitry 30 will proceed from step 232 to step 234. In this situation, from step 234, computer circuitry 30 will proceed to step 240 at which computer circuitry 30 will proceed to establish the elapsed time that the caregiver or the item of equipment was in the room.

In step 240, computer circuitry 30 determines whether the batch database entry for the caregiver or item of equipment has a time "in". In the case of an equipment entry 76, computer circuitry 30 will look for a time "in" identified by field 80. In the case of a caregiver entry 68, computer circuitry 30 will search for a time "in" in a field 74a, 74b, 74c, etc. which is not associated with a time "out" in a field 75a, 75b, 75c, etc.

If the entry contains a time "in", then computer circuitry 30 proceeds to step 242, and determines the elapsed time since that time "in". This is the time that has elapsed since the caregiver or item of equipment entered the room for participation in the procedure. This elapsed time is added to the elapsed time in the caregiver or equipment entry (field 72 or 82, respectively). Then, in the case of an caregiver entry 68, computer circuitry 30 stores a time "out" in a field 75 associated with the time "in", thus indicating that the caregiver has left the room. In the case of an equipment entry 76, the time "in" field 80 is cleared to an empty value. When the time "out" is stored, or time "in" is cleared, this indicates that although the caregiver or equipment did enter the patient room during the procedure, the caregiver or equipment has departed the room and is not presently in the room.

After step 242, computer circuitry 30 proceeds to step 244 at which it updates the appropriate records for the caregiver or equipment. Specifically, computer circuitry 30 increments the number of uses stored in the equipment cost/location database (field 130, FIG. 7A) or the number of patient visits stored in the caregiver cost/location database (field 159, FIG. 7B), as appropriate. Next, the elapsed time (previously computed in step 242) is added to the total elapsed time stored in the equipment cost/location database (field 132, FIG. 7A) or caregiver cost/location database (field 161, FIG. 7B), respectively. Finally, the cost figures for the equipment or caregiver are retrieved from the cost/location database for later use.

Figure 9B:
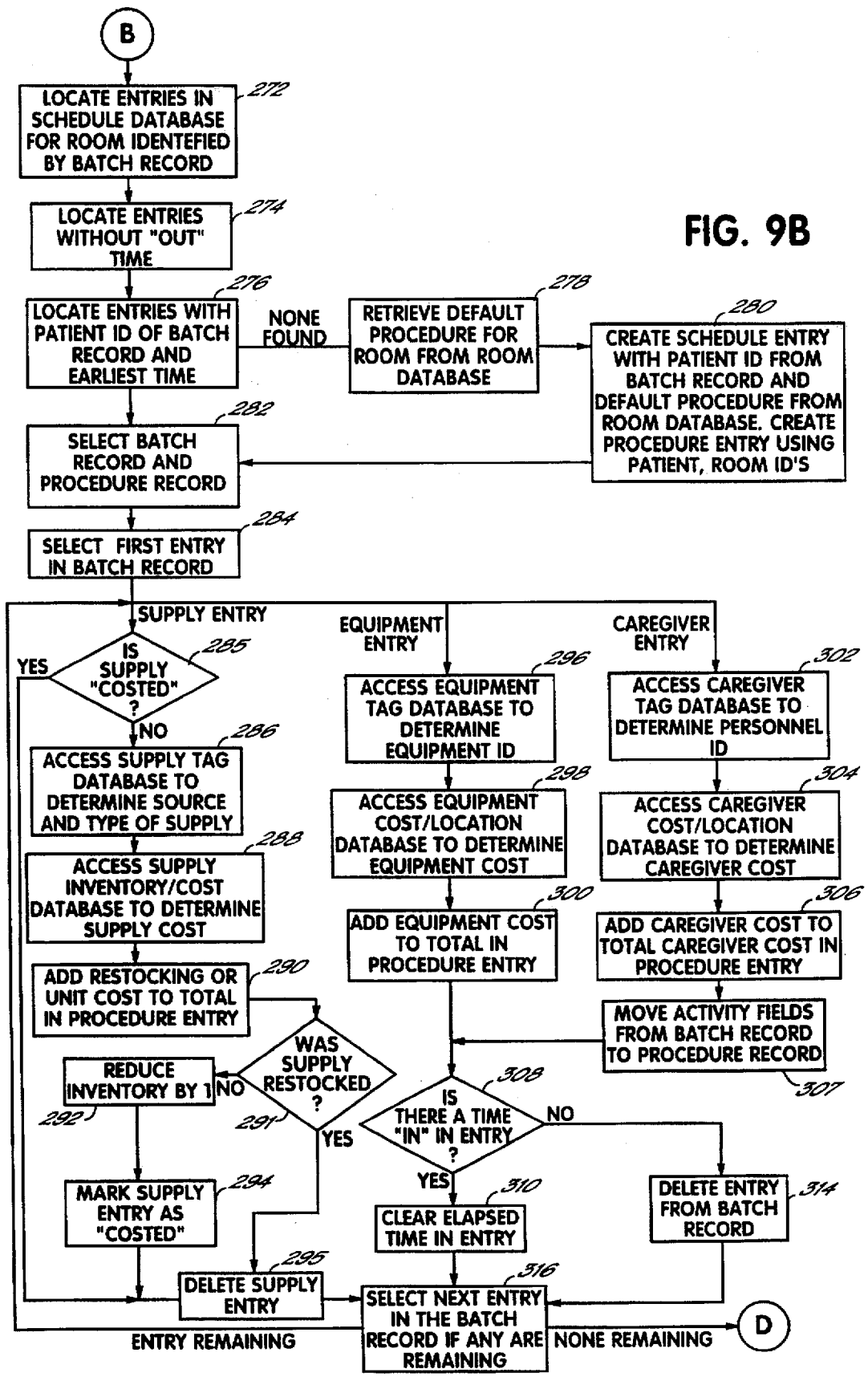

After thus updating the batch database and cost/location databases, the computer circuitry proceeds to step 246 to determine whether the elapsed time should be charged to a patient procedure. In this step, computer circuitry 30 determines whether a patient is in the room that the caregiver or equipment departed. This is done by searching for a patient entry 60 in the batch database record having a time "in" in its field 64. If there is still a patient in the room where the procedure is being performed, the procedure is assumed to be incomplete, and as a result, no charges are made at this time for the time spent by the caregiver or item of equipment in the room during that procedure. Rather, the time spent by the caregiver or equipment is accounted for and charged to the procedure when the patient leaves the room, as will be discussed below with reference to FIG. 9B.

If, however, there is no patient entry 60 in the batch record with a time "in", indicating that there is no longer a patient in the room where the procedure was performed, then the elapsed time of the equipment or caregiver is charged to the patient and procedure which was most recently performed in the room.

To do this, computer circuitry 30 proceeds to step 248 (FIG. 9C) in which computer circuitry 30 uses the cost information obtained from the appropriate cost/location database (FIG. 7A or FIG. 7B) to determine the cost for the elapsed time spent by the equipment or caregiver in the room where the procedure was performed. This may involve retrieving a fixed cost per use or visit (field 120, FIG. 7A, field 148, FIG. 7B), or multiplying the elapsed time by a hourly cost (field 118, FIG. 7A, field 146, FIG. 7B), or both. The resulting cost figure indicates the cost of the time spent by the equipment or caregiver in the room where the procedure was performed. It should be noted that the total elapsed time in the caregiver or equipment entry, in field 72 or 82, respectively, may be larger than the incremental elapsed time added in step 242, for example if the caregiver or equipment has repeatedly entered and departed the room during the procedure. For purposes of the computation in step 248, the total elapsed time found in field 72 or 82 is used to determine the total cost associated with time spent by the caregiver or equipment in the room.

When this cost figure has been determined, computer circuitry 30 must determine which procedure should be charged for the time spent by the caregiver or equipment. To do this, computer circuitry 30 proceeds to step 250.

In step 250, computer circuitry 30 accesses the schedule database (FIG. 8A) to locate a record 154 for the procedure which was performed most recently in the room that the caregiver or equipment departed. To do so, computer circuitry 30 searches for a schedule record in the schedule database (FIG. 8A) having the room identifier. If this search finds multiple schedule records having the same room identifier (indicating multiple events scheduled in that room at potentially different times), computer circuitry 30 locates the schedule record with the most recent "out" time in field 158. As will be noted below, when a patient departs a room at the end of procedure, the schedule database is updated with the time that the patient departed the room in the "out" time field 158. The schedule record 154 with the most recent "out" time, therefore, will indicate the most-recent procedure performed in the room. Accordingly, this record in selected by computer circuitry 30 in step 250.

Next, computer circuitry 30 uses the procedure identifier contained in field 160 of the schedule record 154 to access a procedure record 163 in the procedure database of FIG. 8B. This will be a procedure record 163 for the procedure that was most recently performed in the room, and will include fields 170 through 176 indicating the costs of that procedure.

After the appropriate procedure record 163 has been accessed in step 252, computer circuitry 30 proceeds to step 254 in which the equipment or caregiver costs computed in step 248 are added to the appropriate field 170 or 174 in the procedure record. By so doing, computer circuitry 30 updates the cost information in the procedure record 163 to reflect the rental cost of equipment or the personnel cost of individuals who remained in the room after the patient departed the room at the end of the procedure.

After storing this cost information in the procedure record 163, if the exit of a caregiver is being processed, computer circuitry 30 proceeds to step 255, and stores the caregiver's identifier (from field 108, FIG. 7B), and the caregiver's entry/exit times (fields 74a, 75a, 74b, 75b, etc. of caregiver entry 68 of the batch record 58), into the appropriate fields 108, 74 and 75 of a caregiver entry 177 in the procedure record 163. Doing so produces a permanent record, associated with the procedure and its costs, of the identity and movements of the caregiver involved with that procedure.

After these steps have been completed, in step 256 the caregiver or equipment entry 68 or 76 in the batch database record 58 is deleted from the batch database, so that future procedures performed in the room will not be charged any time that has already been charged to the patient and procedure recently completed in the room. After step 256, processing of the tag reader message is completed.

As noted above, it is possible that a caregiver or item of equipment may enter and exit a room multiple times during a procedure. In accordance with principles of the present invention, these multiple entries and exits are detected and recorded. Specifically, when a caregiver or item of equipment exits and re-enters a room during an ongoing procedure, upon re-entry, computer circuitry 30 will, in step 240 (FIG. 9), locate an entry 68 or 76 in the batch database for the caregiver or equipment, which does not indicate a time "in" (because the time "in" has been cleared, or associated with a time "out", in step 242, when the caregiver previously departed the room). In this case, computer circuitry 30 will proceed to step 258 to mark the caregiver or equipment entry with a time "in". Particularly, where equipment has been detected re-entering the room, the time of reentry is stored in field 80 of the equipment entry 76 of the batch database record 58. Where a caregiver has been detected re-entering the room, an additional time "in" field 74, indicating the time of re-entry, is added to the caregiver entry 68 of the batch database record 58.

Returning now to step 232, FIG. 9, as has been noted above, when a patient is detected departing a room, it is assumed the procedure that the patient was undergoing is completed. Therefore, when a tag reader message is received indicating that a patient is departing a room in the health care facility, computer circuitry 30 proceeds from step 232 to step 260.

In step 260, computer circuitry 30 begins the process of computing the cost of the procedure that was just completed upon departure of the patient from the room. In step 260, computer circuitry 30 computes the time elapsed since the patient entered the room, by comparing the time of the patient's departure to the time "in" registered in field 64 of the patient entry 60 of the batch database record 58. This elapsed time is added to the elapsed time stored in field 66 in the patient entry 60, so that there is a record of the total time elapsed when the patient was in the room. At the same time, the time "in" field 64 of the patient entry 60 is cleared.

Following step 260, computer circuitry 30 proceeds to compute cost figures for the procedure just completed for the patient departing the room. To do so, computer circuitry 30 reviews each entry in the batch record 58 and computes the cost associated with the person or object identified by the batch record, if possible.

As noted above, if equipment or a caregiver remain in the room after departure of a patient, the time spent in the room after departure is charged to the most recent procedure. While this process will accurately account for time spent after the procedure in most instances, in some instances it may lead to inaccuracies. For example, if the equipment or caregiver remains in the room to await the arrival of a new patient for a new procedure, it is important that the time spent by the caregiver or equipment in the room is properly apportioned between the first procedure and the second procedure.

To ensure proper apportionment, when the patient leaves the room, the caregivers and equipment remaining in the room are timed out, i.e., computer circuitry 30 computes their time spent in the room prior to the patient's departure, and charges this time to the departing patient's procedure, so that this time is properly associated with the departing patient.

To achieve this, computer circuitry 30 must locate those caregivers and equipment remaining in the room after a patient's departure. To do so, in steps 262–270 computer circuitry 30 selects each caregiver and equipment entry in the batch record 58 for the current room, and performs a sequence of operations to compute the elapsed time and cost for each entry in the batch record, if possible.

Specifically, in step 264, computer circuitry 30 determines whether an entry has a time "in" (i.e., a time "in" in field 80 of an equipment entry 76, or a time "in" in a field 74 of a caregiver entry 68 which is not associated with a time "out" in a field 75). If so, in step 266, computer circuitry 30 determines the elapsed time from the time "in" to the current time, and adds this time to the elapsed time field in the entry.

First, in step 267, the elapsed time in the caregiver or equipment entry, computed in step 266, is added to the total use time in field 132 of the equipment's cost/location record 116 or the accumulated time with patients in field 161 of the caregiver's cost/location record 144. This updates the equipment or caregiver record to accurately reflect the time of use or time with patients.

Then, in step 268, computer circuitry 30 creates a new time "in" equal to the present time. (In the case of an equipment entry 76, step 268 involves storing the current time in field 80 of the equipment entry 76; in the case of a caregiver entry 68, step 268 involves storing the current time in a time "out" field 74, and then creating a new time "in" field 75 in the caregiver entry 68 and storing the current time in this new field.)

After these steps, or immediately after step 264 if the entry is a supply entry or does not have a time "in", computer circuitry 30 selects the next entry in the batch record (step 270) and returns to step 264 to process this next entry. Ultimately, computer circuitry 30 performs these steps for all entries in the batch record 58. In this case, computer circuitry 30 proceeds to step 272 (FIG. 9B), and begins a process for associating the activities identified in the batch record with a particular procedure and patient.

In particular, in step 272, computer circuitry 30 locates all entries in the schedule database (FIG. 8A) which identify the room the patient departed. In step 276, these entries are then evaluated in step 274 to locate those entries that do not contain an "out" time in field 158. Those entries which to do not have an "out" time are then evaluated to locate an entry having the same patient identifier as the patient who was detected departing the room. If multiple entries identify this patient, then the entry with the earliest scheduled time is selected.

In some cases, there may be no schedule record in the schedule database for the activity performed in the room for the patient. This may be the case if the patient was brought in the room for emergency unscheduled surgery or some other unscheduled activity. In this case, computer circuitry 30 proceeds from step 276 to step 278. In step 278, computer circuitry 30 accesses the room information/cost database (FIG. 7E) and locates the record 147 for the current room. Then, computer circuitry 30 retrieves the default procedure type in field 153 for the room. Then, in step 280, computer circuitry 30 uses this default procedure type to create the schedule entry 154 and a procedure entry 163 for the activity undergone by the patient in the room. As the new schedule entry 154 is created, the identifier for the room is inserted in field 56, the current time is inserted as the scheduled time 156, and the identifier of the patient detected exiting the room is inserted into the patient ID field 114. Then a unique procedure identifier is selected and stored in field 160 in the new schedule record and in field 160 of the new procedure record 163. At the same time, the default procedure type for the room (field 153 of room record 147) is inserted in the type identifier field 164 in the new procedure record 163, and the room identifier and patient identifier are also inserted into fields 166 and 168 in the new procedure record 163.

Thus, even when an unscheduled activity is undertaken in a monitored room, computer circuitry 30 will create the appropriate schedule and procedure records to track the costs of the activity. For rooms which are only used for one purpose, for example MRI rooms, the automatically created schedule and procedure entries may be entirely accurate. However, for many rooms, it may be impossible to predict with accuracy what type of procedure might be performed at any given time. For rooms of this kind, the default procedure type for the room might be set to a value of "unknown". In this case, later maintenance procedures might be performed by administrative staff, for example at the end of each day, to determine the specific unscheduled procedures that were performed. As is noted below, each procedure record is automatically associated with identifiers for the caregivers who performed the procedure (in fields 108 of the caregiver entries 177 in the procedure record 163); therefore, administrative staff members could easily print out questionnaires to be filled in by staff members who participated in an unscheduled activity, and deliver the questionnaires to the participating staff members, e.g., via interoffice mail, so that the staff members can identify the procedure. These questionnaires could be automatically generated immediately upon generation of an "unknown" type procedure record, or at regular times throughout the day, and delivered rapidly to the participating staff members while memories of the procedure are still fresh.

Whether a schedule entry is located in step 276, or created from default information as described above, computer circuitry 30 will ultimately arrive at step 282. In step 282 and the following steps, computer circuitry 30 will undertake the task of computing the cost associated with supplies used in the room as well as the time spent by caregivers and equipment in the room.

To compute costs, computer circuitry 30 selects in step 282 the appropriate batch record 58 and the procedure record 163, and then locates (step 284) the first entry in the batch record.

If the entry in the batch record is a supply entry, computer circuitry 30 first determines 285 if the supply is marked as "costed" in field 97 of the associated entry 90 of the supply tag database of FIG. 6A. If so, the supply has already been charged to another patient and should not be charged again. In this case, computer circuitry 30 proceeds directly to step 295 and deletes the supply entry, and then continues to step 316 to select the next entry in the batch database.

However, if the supply is not "costed", computer circuitry 30 proceeds to charge the cost of the supply to the patient. To do so, computer circuitry 30 proceeds to step 286 and accesses fields 94 and 96 of the supply tag database (FIG. 6A) to determine the source and type of the supply. Next, computer circuitry 30 proceeds to step 288 in which it accesses an entry 134 in the supply inventory/cost database (FIG. 7D) to determine the cost of the supply. If the "restocked" flag in field 88 of the supply entry is cleared, then the full unit cost of the supply, from field 140 of entry 134, is retrieved. However, if the "restocked" flag in field 88 of the supply entry is set, this indicates that only the restocking cost should be charged, and accordingly the restocking cost, from field 142b of entry 134, is retrieved. In either case, in step 290, computer circuitry 30 adds the retrieved cost to the total supplies cost in field 172 of the procedure database record 163, and continues to step 291.

If the supply was restocked, i.e., if the restocking flag in field 88 of the supply entry 84 in the batch database is set, computer circuitry 30 skips directly from step 291 to step 295 and deletes the supply entry 84 from the batch database. However, if the supply was not restocked, computer circuitry proceeds to step 292, and decrements the inventory in field 138 of the supply inventory/cost database, indicating that one of this type of supply has been consumed. Also, in step 294, computer circuitry 30 marks field 97 of the entry 90 in the supply tag database as "costed", to indicate that the cost of the supply has been charged to a patient procedure. Thereafter, computer circuitry arrives at step 295, and the supply entry is deleted from the batch record.

If an entry being analyzed is an equipment entry 76, then computer circuitry 30 follows the steps beginning with step 296. In step 296, computer circuitry 30 uses the tag number in the equipment entry 76 to access the equipment tag database (FIG. 6B) to determine the identifier for the equipment. In step 298, this equipment identifier is used to locate a record 116 for the equipment in the equipment cost/location database (FIG. 7A). Once the record 116 for the equipment is located, fields 118 and 120 of the record are then used to determine the cost associated with the use of the equipment for the time identified in the batch record. Specifically, cost per use identified in field 120 is added when necessary to the cost per hour 118 multiplied by the elapsed time in field 82 of the equipment entry 76 in the batch database. In step 300, this cost is added to the total equipment cost identified in field 174 of the procedure record 163.

Similarly, if the entry being processed is a caregiver entry, computer circuitry 30 begins at step 302 by accessing the caregiver tag database (FIG. 6C) to determine the personnel identifier for the caregiver. Next, in step 304, computer circuitry 30 accesses the caregiver cost/location database (FIG. 7B) to determine the cost of the caregiver's time spent. This may involve adding a cost per visit from field 148, to a cost per hour in field 146 multiplied by the elapsed time in field 72 of the caregiver entry 68. In step 306, the resulting cost is added to the caregiver costs field 170 in the procedure record.

Next, in step 307, computer circuitry 30 stores the identifier of the caregiver (from field 108, FIG. 7B), and the caregiver's stored entry/exit times (fields 74a, 75a, 74b, 75b, etc. of caregiver entry 68 of the batch record 58), into the appropriate fields 108, 74 and 75 of the caregiver entry 177 of the procedure record 163 (fields 74, 75 moved from the batch entry 68 are deleted from the batch entry 68). If there is a time "in" in a field 74 not associated with a time out in a field 75, the field 74 is not moved from batch entry 68. This produces a permanent record, associated with the procedure and its costs, of the identity and movements of the caregiver involved with that procedure.

After computing the cost for equipment or a caregiver's time, computer circuitry 30 proceeds to step 308 in which it determines whether the caregiver or equipment has remained in the room after the departure of the patient. This is determined by checking the equipment entry 76 for a time "in" in field 80, or by checking the caregiver entry 68 for a time "in" in a field 74 which is not associated with a time "out" in a field 75. If there is a time "in" in the caregiver or equipment entry, this indicates that the caregiver or equipment has remained in the room beyond the departure of the patient. In this situation, computer circuitry 30 proceeds to step 310 in which it clears the elapsed time stored in field 72 or 82 for the caregiver or equipment. This avoids double billing for time that has already been charged in steps 300 and 306 to the procedure. If the caregiver or equipment later leaves the room before another patient arrives, then the additional time accrued will be charged to the current procedure as a result of the actions discussed above in connection with steps 242 and the following steps.

If, in step 308, computer circuitry 30 finds that the entry does not have a time "in", this indicates that the caregiver or equipment departed the room prior to the patient. In this situation, the activities that the caregiver or equipment will contribute to the patient care procedure, are assumed to be complete. Therefore, in this case, computer circuitry 30 proceeds to delete the caregiver's or equipment's information from the batch database in step 314.

After determining the cost associated with a batch entry, and the other recordkeeping activities associated with the entry, computer circuitry 30 selects the next entry in the batch record in step 316, and if are remaining entries, returns to one of steps 285, 296 or 302.

If, however, there are no entries remaining in the batch record, computer circuitry 30 proceeds to step 318 in FIG. 9D. In step 318 and the following steps, computer circuitry 30 proceeds to compute the cost for use of the room by the patient. This is done by accessing the room information/cost database (FIG. 7E) and identifying the record 147 in that database for the room. Then, field 66 of the patient entry 60 in the batch database record 58 is accessed, to determined the elapsed time that the patient spent in the room. Then, in step 320, computer circuitry 30 uses the room cost per hour (field 151 of the room information/cost database record 147) to determine the cost of the patient's use of the room for the time that the patient spent in the room. In step 322, this cost is added to the total room costs stored in field 176 in the procedure record 163.

Next, in step 324, the patient's elapsed time for the procedure is stored in the procedure entry 163, field 178, so that this time may be referenced later as noted above. Thereafter, the patient entry 60 is deleted from the batch record 58 for the room.

After the above processing, costs for the various supplies, equipment and caregivers who were in the room during a procedure have been computed and stored in the procedure record 153. At this time, the room may be considered available for a next procedure, and the current procedure considered finished. Therefore, in step 326, the current time is stored in the "out" time field 158 in the schedule record 154 for the procedure.

Through the application of the above steps and data manipulations, it will be seen that cost figures may be automatically generated from the activities of individuals and movements of objects in a medical services business, without requiring modification of individual behaviors and with minimal or no expenditure of time or personnel resources. The resulting cost figures and other information, compiled in procedure records 163, may be advantageously used to accurately track and control costs of providing services in areas where such tracking and control has previously been difficult or unavailable.

Figure 10:
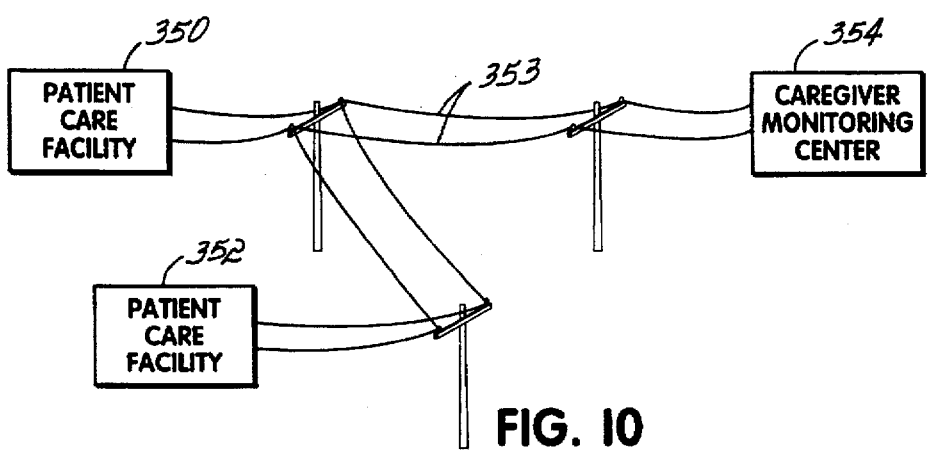
FIG. 10 is a block diagram illustrating a wide-area network for performing cost tracking at a plurality of patient care facilities.

Referring now to FIG. 10, in one embodiment of the present invention, cost tracking information generated at two or more patient care facilities 350, 352 may be forwarded via telephone lines 353 or another suitable communications connection, to a central caregiver monitoring center 354, for example a hospital chain headquarters or insurance provider home office, so that cost tracking information from multiple patient care facilities may be readily compared and contrasted. Furthermore, in one embodiment some or all of the processing performed by computer circuitry 30 as described may be performed at the central monitoring center 354 using databases stored at the central monitoring center 354. In the latter case, for example, only tag reader messages and information needed to initialize schedule records 154 and procedure records 163 need be transferred over telephone lines 353, with all remaining processing performed at monitoring center 354. Tag reader messages might be transmitted over telephone lines 353 in real time, or alternatively might be stored at the patient care facility along with a time stamp, and then the collection of time stamped tag reader messages forwarded in a batch to the monitoring center 354 and processed collectively as if they were received in real time at the times indicated in the associated time stamps.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Although supplies typically would be considered as tools and the like used by medical care givers, supplies is used herein in a broader sense to include any items used on or with a patient and thus includes pharmaceutical compounds, doses or injectables to be given to a patient. Accordingly, departures may be made from such details without departing from the spirit or scope of applicant's general inventive concept.

What is claimed is:

1. An activity-based cost tracking system for tracking the costs of an activity undertaken within a defined space by a person or an object having an assignable cost, comprising a first transponder attached to a person or an object participating in said activity, said first transponder providing a unique identifying code, a transponder reader associated with said defined space reading said first transponder and receiving said code to identify said first transponder, a database associating said code with said person or object to which said first transponder is attached, and assigning a cost to said person or object, and a cost computer responsive to said transponder reader and said database for identifying said person or object to which said first transponder is attached, identifying an activity being undertaken by said person or object, from a plurality of activities that might be undertaken in said defined space, determining the time during which said person or object is occupied in said activity, and computing therefrom a cost of said activity undertaken by said person or object within said defined space.

2. The system of claim 1 wherein said transponder reader is associated with an entry to said defined space and detects passage of said first transponder through said entry, and said cost computer determines the time during which said person or object is occupied in said activity by recording the duration between times at which said transponder is detected passing through said entry.

3. The system of claim 1 wherein said first transponder is attached to a person, further comprising a second transponder attached to an additional person and providing a second unique identifying code;

wherein said database associates said second code from said second transponder with said additional person, and assigns a cost to said additional person, and said cost computer responds to said transponder reader and said database for computing a cost of activities undertaken by both said persons within said defined space.

4. The system of claim 1 wherein said reader communicates with said transponders via wireless radio frequency communication.

5. The system of claim 1 wherein said reader communicates with said cost computer via wireless radio frequency communication, whereby said reader may be rapidly positioned to track costs in different defined spaces.

6. The system of claim 1 wherein said cost computer tracks total time in which said person or object is occupied in said activities, said database stores a time cost rate for said person or object, and said cost computer computes costs for activities based on a time cost rate for said person or object and the time said person or object was occupied by said activities.

7. The system of claim 1 wherein said cost computer tracks the time for which said person or object is occupied in said activities, and said cost computer accumulates time for which said person or object is occupied in a plurality of different activities and stores the accumulated time in said database, whereby the time spent in multiple activities may be accurately determined for performance evaluation or maintenance purposes.

8. The system of claim 1 wherein said database indicates a number of activities undertaken by said person or object, and said cost computer increases the number of activities undertaken by said person or object whenever said person is detected participating in an activity, whereby the number of activities engaged by said person may be accurately determined for performance evaluation or maintenance purposes.

9. The system of claim 1 wherein said database stores a cost per usage for said object and said cost computer computes costs for activities of said object based on said cost per usage.

10. The system of claim 1, wherein
said database associates said reader with a reader location, and further associates said person or object with a location, and
said cost computer associates said person or object with said reader location when said reader identifies a transponder attached to said person or object.

11. The system of claim 10, further comprising
a plurality of readers each associated with a defined space and reading transponders to receive coded signals identifying transponders, wherein
said database associates each said reader with a reader location, and
said cost computer associates said person or object with the location of a reader which most recently identified said first transponder attached to said person or object.

12. The system of claim 1 wherein said first transponder is attached to an object,
further comprising a second transponder attached to an additional object,
wherein said database associates a code from said second transponder with said additional object, and assigns a cost to said additional object, and
said cost computer responds to said transponder reader and said database for computing the cost of activities undertaken by all objects within said defined space.

13. The system of claim 12 wherein
said objects comprise a supply which is consumed during activities and an item of equipment which is used but not consumed during activities, and
said database associates said supply with its replacement cost, and
said database associates said item of equipment with its rental cost when used in an activity.

14. The system of claim 13 wherein
said database associates said supply with a restocking cost, and
said cost computer responds to activities indicative of restocking of said supply by adding said restocking cost to said cost of activities undertaken by all objects within said defined space.

15. A system for tracking activities in a defined space, comprising
a transponder attached to a person or object participating in an activity, said transponder providing a unique code signal identifying said transponder,
a portable transponder reader associated with said defined space to monitor activities in that space, said reader reading said transponder and receiving said code to identify said transponder, said reader transmitting said received code via radio frequency communication,
a database associating said code with said person or object to which said transponder is attached, and
a tracking computer receiving said code from said reader via said radio frequency communication, and reading said database to identify said person or object within said defined space.

16. The system of claim 15 wherein said reader communicates with said transponders via wireless radio frequency communication.

17. A method of tracking a cost of an activity undertaken in a defined space by a person or object having an assignable cost, comprising
attaching a first transponder to a person or an object participating in said activity, said first transponder providing a unique identifying code,
associating a transponder reader with said defined space to read said first transponder and receive said code to identify said first transponder,
storing in a database an association between said code and said person or object to which said first transponder is attached, and a cost for said person or object,
reading said code from said first transponder using said transponder reader,
identifying an activity being undertaken by said person or object, from a plurality of activities that might be undertaken in said defined space,
determining the time during which said person or object is occupied in said activity,
computing a cost of said activity undertaken within said defined space by said person or object, using said determined time and said cost from said database.

18. The method of claim 17 wherein said transponder reader is associated with an entry to said defined space and detects passage of said first transponder through said entry, determining the time during which said person or object is occupied in said activity including recording the duration between times at which said transponder is detected passing through said entry.

19. The method of claim 17 wherein said first transponder is attached to a person, further comprising
attaching a second transponder attached to an additional person,
storing in said database an association between a code from said second transponder and said additional person, and a cost for said additional person, and
responding to codes received by said transponder reader by computing a cost of activities undertaken by both said persons within said defined space.

20. The method of claim 17 further comprising said reader communicating with said transponders via wireless radio frequency communication.

21. The method of claim 17 further comprising
tracking total time in which said person or object is occupied in said activities,
storing in said database a time cost rate for said person or object, and
computing costs for activities based on a time cost rate for said person or object and the time said person or object was occupied by said activities.

22. The method of claim 17 further comprising
accumulating time for which said person or object is occupied in a plurality of different activities and storing the accumulated time in said database,
whereby the time spent by said person or object in multiple activities may be accurately determined for performance evaluation or maintenance purposes.

23. The method of claim 17 further comprising
storing in said database a number of activities undertaken by said person or object, and
increasing said number of activities undertaken by said person or object whenever said person is detected participating in an activity,
whereby the number of activities engaged by said person or object may be accurately determined for performance evaluation or maintenance purposes.

24. The method of claim 17 further comprising
storing in said database a cost per usage for said object, and
computing a cost for activities of said object based on said cost per usage.

25. The method of claim 17, further comprising storing in said database an association between said reader and a reader location, and responding to receipt of said code from said transponder reader by storing in said database an association between said person or object and said reader location.

26. The method of claim 25, further comprising associating a respective plurality of readers with a respective plurality of defined spaces, storing in said database an association between each said reader and its respective reader location, reading said first transponder using one of said plurality of readers, to receive said code identifying said first transponder, and storing in said database an association between said person or object and the location of a reader which most recently identified said first transponder attached to said person or object.

27. The method of claim 17 wherein said first transponder is attached to an object, further comprising attaching a second transponder attached to an additional object, storing in said database an association between a code from said second transponder and said additional object, and a cost for said additional object, and responding to codes received by said transponder reader by computing the cost of activities undertaken by all objects within said defined space.

28. The method of claim 27 wherein said objects comprise a supply which is consumed during activities and an item of equipment which is used but not consumed during activities, further comprising associating said database in said supply with its replacement cost, and associating said database in said item of equipment with its rental cost when used in an activity.

29. The method of claim 28 further comprising associating said database in said supply with a restocking cost, and responding to activities indicative of restocking of said supply by adding said restocking cost to said cost of activities undertaken by said objects within said defined space.

30. A method for tracking activities in a defined space, comprising attaching a transponder to a person or object participating in an activity, said transponder providing a unique code signal identifying said transponder, reading said transponder and receiving said code to identify said transponder, and then transmitting said code via radio frequency communication, storing in a database an association between said code and said person or object to which said transponder is attached, and receiving said code via said radio frequency communication, and reading said database to identify the presence of said person or object within said defined space.

31. The method of claim 30 further comprising reading said transponder and receiving said code via wireless radio frequency communication.

* * * * *

UNITED STATES PATENT AND TRADEMARK OFFICE
CERTIFICATE OF CORRECTION

PATENT NO. : 5,732,401

DATED : March 24, 1998

INVENTOR(S) : David Conway

It is certified that error appears in the above-identified patent and that said Letters Patent is hereby corrected as shown below:

Column 9, line 4, delete "dam", insert --data--.

Column 11, line 53, delete "storm", insert --stored--.

Column 12, line 10, delete "capita/", insert --capital--.

Column 21, line 60, delete "which to do", insert --which do--.

Column 24, line 15, delete "dears", insert --clears--.

Column 24, line 35, delete "and if are", insert --and if there are--.

Column 24, line 44, delete "determined", insert --determine--.

Column 25, line 2, delete "requiting", insert --requiring--.

Signed and Sealed this

Twenty-fifth Day of May, 1999

Attest:

Q. TODD DICKINSON

*Attesting Officer*  *Acting Commissioner of Patents and Trademarks*